United States Patent
Lowit et al.

(10) Patent No.: US 10,104,182 B1
(45) Date of Patent: Oct. 16, 2018

(54) SYSTEM AND METHOD OF FACILITATING COMMUNICATION WITHIN AN INTERFACE SYSTEM

(71) Applicant: ARVE Capital, LLC, Washington, DC (US)

(72) Inventors: David Lowit, Washington, DC (US); Philip Lowit, Washington, DC (US)

(73) Assignee: ARVE CAPITAL, LLC, Washington, DC (US)

( * ) Notice: Subject to any disclaimer, the term of this patent is extended or adjusted under 35 U.S.C. 154(b) by 209 days.

(21) Appl. No.: 15/200,967

(22) Filed: Jul. 1, 2016

Related U.S. Application Data

(60) Provisional application No. 62/188,249, filed on Jul. 2, 2015.

(51) Int. Cl.
*H04L 15/16* (2006.01)
*H04L 29/08* (2006.01)
(Continued)

(52) U.S. Cl.
CPC .......... *H04L 67/141* (2013.01); *G06Q 10/06* (2013.01); *G06Q 10/109* (2013.01);
(Continued)

(58) Field of Classification Search
CPC .. G06Q 10/1053; G06Q 10/06; G06Q 10/109; H04L 67/141
(Continued)

(56) References Cited

U.S. PATENT DOCUMENTS

| 8,572,000 B1 * | 10/2013 | Weingarten | G06Q 10/1053 705/320 |
| 2003/0126205 A1 * | 7/2003 | Lurie | G06Q 10/109 709/204 |

(Continued)

FOREIGN PATENT DOCUMENTS

| WO | 01/25987 A1 | 4/2001 |
| WO | 2009/133565 A2 | 11/2009 |

(Continued)

OTHER PUBLICATIONS

Gartside et al., Trends Reshaping the Future of HR: The Rise of the Extended Workforce, Accenture: Institute for High Performance, 2013, pp. 1-16.

*Primary Examiner* — Ranodhi Serrao
*Assistant Examiner* — James N Fiorillo
(74) *Attorney, Agent, or Firm* — The Marbury Law Group, PLLC

(57) ABSTRACT

A method and apparatus for communicating information within an interface system is provided. The method includes receiving information associated with a first opportunity provider, the information associated with the first opportunity provider being received from a first opportunity provider device, receiving information associated with an enterprise, the information associated with the enterprise being received from an enterprise network access device, establishing a connection between the first opportunity provider and the enterprise within the interface system, receiving information associated with a first service provider, the information associated with the first service provider being received from a first service provider device, and establishing a connection between the first service provider and the first opportunity provider within the interface system.

20 Claims, 10 Drawing Sheets

(51) Int. Cl.
*G06Q 10/10* (2012.01)
*G06Q 10/06* (2012.01)

(52) U.S. Cl.
CPC ......... *G06Q 10/1053* (2013.01); *H04L 67/10* (2013.01); *H04L 67/20* (2013.01)

(58) Field of Classification Search
USPC .......................................... 709/228; 705/321
See application file for complete search history.

(56) References Cited

U.S. PATENT DOCUMENTS

| | | | |
|---|---|---|---|
| 2003/0154122 A1 | 8/2003 | Jackson, Jr. et al. | |
| 2004/0107192 A1 | 6/2004 | Joao | |
| 2006/0036647 A1* | 2/2006 | Fichtner | G06Q 10/10 |
| 2006/0229896 A1* | 10/2006 | Rosen | G06Q 10/10 |
| | | | 705/321 |
| 2007/0033064 A1* | 2/2007 | Abrahamsohn | G06Q 10/06 |
| | | | 705/321 |
| 2007/0055634 A1 | 3/2007 | Albertao | |
| 2008/0015912 A1* | 1/2008 | Rosenthal | G06Q 10/06 |
| | | | 705/7.14 |
| 2008/0027747 A1 | 1/2008 | McGovern et al. | |
| 2008/0133595 A1* | 6/2008 | Hyder | G06Q 10/00 |
| 2009/0070126 A1* | 3/2009 | MacDaniel | G06Q 10/1053 |
| | | | 705/321 |
| 2009/0083235 A1 | 3/2009 | Joao | |
| 2009/0299829 A1* | 12/2009 | Fraser | G06Q 10/06311 |
| | | | 705/7.14 |
| 2011/0276507 A1* | 11/2011 | O'Malley | G06Q 10/00 |
| | | | 705/321 |
| 2012/0053996 A1* | 3/2012 | Galbavy | G06Q 10/06398 |
| | | | 705/7.42 |
| 2012/0109837 A1* | 5/2012 | Sahagun | G06Q 10/1053 |
| | | | 705/321 |
| 2012/0166310 A1 | 6/2012 | Werklund et al. | |
| 2012/0166316 A1 | 6/2012 | Messina et al. | |
| 2012/0173528 A1* | 7/2012 | Kreindler | G06Q 10/1053 |
| | | | 707/737 |
| 2013/0060651 A1* | 3/2013 | Konduri | G06Q 10/06 |
| | | | 705/26.3 |
| 2013/0166465 A1* | 6/2013 | Barros | G06Q 10/1053 |
| | | | 705/319 |
| 2013/0275320 A1* | 10/2013 | Moore | G06Q 10/1053 |
| | | | 705/321 |
| 2013/0282606 A1* | 10/2013 | Bhagat | G06Q 10/1053 |
| | | | 705/321 |
| 2013/0290208 A1 | 10/2013 | Bonmassar et al. | |
| 2013/0325734 A1* | 12/2013 | Bixler | G06Q 10/1053 |
| | | | 705/321 |
| 2015/0100511 A1* | 4/2015 | Khasnis | G06Q 10/1053 |
| | | | 705/321 |
| 2015/0127343 A1* | 5/2015 | Mullor | G10L 17/26 |
| | | | 704/244 |
| 2015/0142602 A1 | 5/2015 | Williams et al. | |
| 2015/0170103 A1* | 6/2015 | Garg | G06Q 10/1053 |
| | | | 705/321 |
| 2016/0162840 A1* | 6/2016 | Roberts | G06Q 10/1053 |
| | | | 705/321 |
| 2017/0140323 A1* | 5/2017 | Laird | G06Q 10/06311 |
| 2017/0337519 A1* | 11/2017 | Joao | G06Q 10/06311 |

FOREIGN PATENT DOCUMENTS

| | | |
|---|---|---|
| WO | 2013/049698 A2 | 4/2013 |
| WO | 2013/049698 A3 | 4/2013 |

\* cited by examiner

SYSTEM AND METHOD OF FACILITATING COMMUNICATION WITHIN AN INTERFACE SYSTEM

PRIORITY

This application claims the benefit under 35 U.S.C. § 119(e) of a U.S. Provisional Application filed on Jul. 2, 2015, in the U.S. Patent and Trademark Office and assigned Ser. No. 62/188,249, the entire disclosure of which is hereby incorporated by reference.

FIELD OF THE INVENTION

The present invention generally relates to facilitating communication between a service provider and an opportunity provider over a communication network. More particularly, the present invention is directed to facilitating communication between a service provider, an opportunity provider, and an enterprise over an interface system.

BACKGROUND

Companies are increasingly transitioning from hiring permanent employees to engaging external service providers for a project or often on a temporary basis. This type of engagement of external service providers improves agility, workforce flexibility, and resource performance and allows a company to identify, find, engage, hire and/or procure a specialist to perform services on an as needed basis, project basis, or to augment staffing needs. Service providers can be contract or contingent workers engaged by companies based on a temporary, project, term, and/or contract basis such as independent contractors.

Typically, companies outsource the responsibility of finding talent for temporary opportunities. For example, employment entities such as recruiters, etc., are tasked with finding and filling temporary, contract, term, and/or project opportunities. However, it is challenging for the employment entities, businesses (enterprises) and users of contingent workers to find qualified service providers due to the fact that availability of such qualified service providers is often unknown. In addition, part-time opportunities are typically not created or sourced by a company, organization, or individual due to the expense and difficulty associated with finding talent. However, this part of the market is not typically being utilized or optimized because there may be service providers willing or available to provide services on a part time basis but are unable to find such opportunities because they have not been created or made aware of opportunities through advertising and/or other channels.

Moreover, the search for potential and future temporary, contract, term, and/or project opportunities can be cumbersome and inefficient for a service provider. It can result in a reduction in work productivity due to the time intensive process of having to search public job boards and cull through numerous opportunity listings. Multiple recruiters contacting the service provider for the same position or opportunity can cause redundancy and provide an undesired distraction to a service provider thereby reducing a service provider's productivity and creating frustration with the search process.

Although conventional job search methods address some of the challenges associated with identifying, finding, procuring, engaging, and/or hiring service providers, there exists a continued need for improvement of the opportunity search, procurement, engagement, and/or hiring process. For example, there exists a continued need to reduce the ramp up and onboarding time necessary to learn company specific systems, protocols, and culture when a new service provider is introduced to a team and/or a project with an organization. Moreover, there exists a need to reduce the noise and distractions within the extended workforce identification, engagement, hiring, and/or procurement system. Further, there exists a need to leverage the knowledge and experience a service provider gained during a previous association with a company, existing talent requirements of the opportunity provider, and current availability of the service provider to improve the opportunity search and/or engagement, hiring, and/or procurement process.

SUMMARY OF THE INVENTION

The present disclosure may solve one or more of the above-mentioned problems and/or achieve one or more of the above-mentioned desirable features. Other features and/or advantages may become apparent from the description which follows.

An aspect of the invention provides a method for communicating information within an interface system. The method includes receiving, at a network node, information associated with a first opportunity provider, the information associated with the first opportunity provider being received from a first opportunity provider device; receiving, at the network node, information associated with an enterprise, the information associated with the enterprise being received from an enterprise network access device; establishing a connection between the first opportunity provider and the enterprise within the interface system; receiving, at the network node, information associated with a first service provider, the information associated with the first service provider being received from a first service provider device; and establishing a connection between the first service provider and the first opportunity provider within the interface system. The first service provider and the enterprise communicate within the interface system based on the connection established between the first service provider and the first opportunity provider and the connection established between the first opportunity provider and the enterprise.

Another aspect of the invention provides a network node for facilitating communication within an interface system. The network node includes a transceiver configured to transmit and receive signals and a controller configured to receive information associated with a first opportunity provider, the information associated with the first opportunity provider being received at the transceiver in a signal from a first opportunity provider device, receive information associated with an enterprise, the information associated with the enterprise being received at the transceiver in a signal from an enterprise network access device, establish a connection between the first opportunity provider and the enterprise within the interface system, receiving information associated with a first service provider, the information associated with the first service provider being received at the transceiver in a signal from a first service provider device, and establish a connection between the first service provider and the first opportunity provider within the interface system. The first service provider and the enterprise communicate within the interface system via the network node based on the connection established between the first service provider and the first opportunity provider and the connection established between the first opportunity provider and the enterprise.

Other aspects of the invention, including apparatus, articles, methods, systems, assemblies, and the like which constitute part of the invention, will become more apparent upon reading the following detailed description of the exemplary embodiments.

BRIEF DESCRIPTION OF THE DRAWINGS

The accompanying drawings are incorporated in and constitute a part of the specification. The drawings, together with the general description given above and the detailed description, serve to explain the principles of the invention. In such drawings.

DETAILED DESCRIPTION

Figure 1:
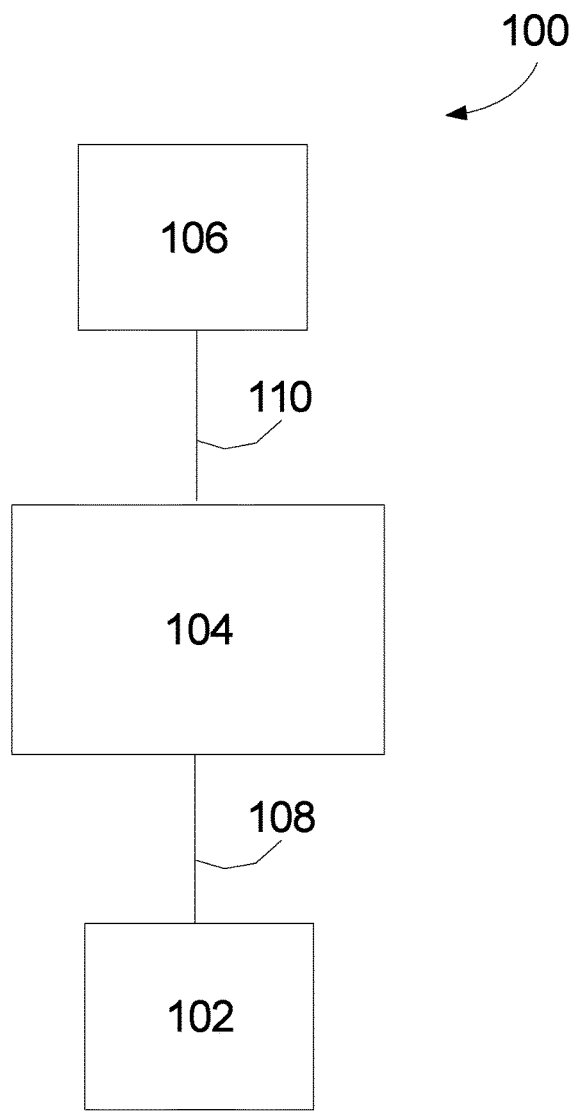
FIG. 1 illustrates a system for communicating between an opportunity provider and a service provider.

Reference will now be made in detail to exemplary embodiments and methods of the invention. It should be noted, however, that the invention in its broader aspects is not necessarily limited to the specific details, representative materials and methods, and illustrative examples shown and described in connection with the exemplary embodiments and methods.

The term "service provider", as used herein, is intended to refer to a worker who can be engaged to provide services to a company, agency, organization, or individual. A service provider can perform services for a company, agency, organization, or individual as an employee or in the capacity of a service provider where the service provider can be a member of the extended workforce or contingent labor pool. In addition, the service provider can be compensated for services provided or the service provider can provide services on a volunteer or pro bono basis (e.g., without being fully compensated) or within an internship or educational capacity. A service provider can perform services for one or more companies, agencies, organizations, or individuals concurrently. Exemplary types of service providers can include knowledge workers, independent consultants, free agents, freelancers, contractors, information technology workers, healthcare aides, medical workers, teachers, lawyers, accountants, professors, authors, hair stylists, bookkeepers, couriers, court reporters, engineers, entertainers, massage therapists, personal trainers, sale representatives, ride sharing participants, tradesman, service industry workers, political staffers, etc. In an exemplary embodiment, a service provider can be a temporary worker, a 1099 worker, independent consultant, or employee or member of a company (direct or third party). However, a service provider is not limited to these examples and as such a service provider may provide any type of service.

The services of the service provider can be utilized such that the service provider is hired, engaged, or procured to provide services for a company, organization, or individual for a period of time such as on a temporary, contract, term, and/or project basis. The duration of the relationship between the service provider and the company, agency, organization, or individual can be predetermined. For example, a service provider can be engaged, hired, or procured for a finite time duration (e.g., a number of hours, weeks, shifts, months, etc.), for a specific project (e.g., when the project is finished, the service provider's work arrangement is completed when the project is finished where there was no prior defined time frame for completion), for time and materials associated with the services provided, for a specific need that exists (e.g., to augment capacity or a specific skill set), for a specific outcome, etc. Alternatively, the service provider can be hired, engaged, or procured such that the relationship between the service provider and the company, agency, organization, or individual is on an as needed basis where an end date for the opportunity is undetermined and/or there is a flexible length of assignment. For example, the opportunity can be temporary with potential for permanent hire, etc.

The term "opportunity provider" is intended to mean a company, agency, organization, or individual or agent of a company, organization, or individual that is tasked with the responsibility of finding, hiring, engaging, and/or procuring the services of a service provider. The services performed by the service provider can be performed for the company, agency, organization, or individual. The opportunity provider can be a direct opportunity provider or an opportunity provider agent. A direct opportunity provider can directly hire, engage, or procure the services of the service provider on behalf of a company, organization, or individual. For example, a direct opportunity provider can be someone (e.g., an employee of the company, organization, or individual) with the ability to hire, engage, or procure the services of a service provider. An opportunity provider agent can interface between a service provider and a company, agency, organization, or individual that has an opportunity to be filled. In an exemplary embodiment, an opportunity provider agent can find potential service provider candidates to introduce to the company, organization, or individual regarding the opportunity. In an alternative exemplary embodiment, the opportunity provider agent can hire or engage the service provider to perform services for the company, organization, or individual. For example, the service provider can be hired or engaged by the opportunity provider agent (e.g., a staffing firm, agency, etc.) where the service provider provides services for the company, organization, or individual (not the opportunity provider agent). In other words, the opportunity provider agent can represent the service provider as its "Employer of Record" or "Agent of Record" while the service provider performs services for the company, organization, or individual. An opportunity provider agent can be a recruiter or third party staffing firm or provider that provides opportunity providers with candidates or staffers (i.e., service providers) to fulfill opportunities associated with the company, organization, or individual.

In an exemplary embodiment, the opportunity provider may be responsible for directly or indirectly engaging, leading, and/or coordinating the work of the service provider or the opportunity provider can manage/oversee a team in which the service provider is associated. The opportunity provider can be evaluated based on the service provider's results for the services provided or the billable time the service provider spends working on the opportunity provider's project and/or tasks to be performed. For instance, the opportunity provider can be responsible for assigning the service provider projects or tasks where the opportunity provider is directly responsible for the results provided by the service provider. The opportunity provider can have the authority to directly hire or engage (e.g., procure the services of) and terminate a service provider.

Typically, an opportunity provider can solicit service providers using various methods such as posting a job opportunity on a job board or enlisting a third party employment entity or staffing firm. When a job opportunity or description associated with the opportunity is posted on a job board, any service provider and/or third party employment entity can access the opportunity. This can be cumbersome and burdensome to the service providers due to the typically large volume of postings. Moreover, numerous third party employment entities can view the posted opportunity such that one service provider is contacted by several different third party employment entities for the same job opportunity.

Various exemplary embodiments described herein can increase talent recruitment and increase productivity (and increase sourcing efficiency) by facilitating contact between opportunity providers and service providers. For instance, various exemplary embodiments employ a system configured to connect opportunity providers with service providers where the opportunity provider and the service provider had a previous association or relationship. For example, the opportunity provider and the service provider previously worked together for a company, organization, etc. Opportunity providers can invite service providers to join their network. The service provider can acknowledge and approve the invitation from the opportunity provider, thereby granting the opportunity provider permission to directly contact the service provider with various job opportunities. If the service provider does not acknowledge and approve the invitation from the opportunity provider, the opportunity provider cannot contact the service provider with various job opportunities (e.g., through the toolset or the opportunity provider/service provider interface).

In an exemplary embodiment, a plurality of service providers can use the same system where each opportunity provider's network is isolated from other opportunity providers' networks thereby preventing contact between a service provider and an opportunity provider in which the service provider does not have a previous relationship. In another exemplary embodiment, two or more opportunity providers can combine networks based on a relational characteristic between the two or more opportunity providers, such as working for the same company, enterprise, etc.

After each service provider acknowledges and approves the invitation to join the opportunity provider's network, the opportunity provider can access the availability or status of each service provider. For example, each service provider can input information associated with a status indicating that the service provider is or is not available to provide services to a company, organization, or individual. In addition, when the service provider has an available status, the service provider can input information associated with current and/or future availability (e.g., the amount of capacity the service provider has to provide services to a company, organization, or individual).

In an exemplary embodiment, the service provider may input information associated with status and availability using any type of input interface. For example, a service provider may input the status and availability information using a calendar or other time scheduling formats. Alternatively, a service provider may input the status and availability information using a pull-down menu, a text block, or any other type of interface.

The availability of all of the service providers can be displayed to the opportunity provider such as through a dashboard where the opportunity provider can determine a service provider's availability based on the information presented on the availability dashboard. The opportunity provider can determine whether to send a job or project opportunity inquiry based on the service provider's availability.

FIG. 1 illustrates a system 100 for establishing communication between an opportunity provider and a service provider. The system 100 can include a service provider device 102, a network node 104, and an opportunity provider device 106. While only one service provider node 102 and one opportunity provider node 106 are illustrated, system 100 can include any number of service provider devices 102 and/or opportunity provider devices 106. In addition, other network elements may be present to facilitate communication within system 100 which are omitted for clarity, including processing nodes, routers, gateways, and physical and/or wireless data links for carrying data among the various network elements.

Service provider device 102 and/or opportunity provider device 106 can be any device configured to communicate over system 100 using a communication interface. For example, the service provider device 102 and/or opportunity provider device 106 can be a wired or wireless device such as a computing platform including a personal computer, a laptop, a mobile device such as a smart phone or a tablet, a remote terminal unit, or any other internet accessible device, and combinations thereof.

The service provider device 102 can transmit and/or receive information from node 104 over communication link 108. The opportunity provider device 106 can transmit and/or receive information from node 104 over communication link 110. Communication links 108, 110 can use various communication media, such as air, space, metal, optical fiber, or some other signal propagation path—including combinations thereof.

The interface of the service provider device 102 and opportunity provider device 106 can include one or more transceivers for transmitting and receiving data over communication system 100. In an exemplary embodiment, each device 102, 106 can include a transceiver associated with at least one wireless protocol, at least one wired protocol, and/or other type of communication protocol.

Service provider device 102 and the opportunity provider device 106 can communicate information over system 100 using various communication services. For example, information communicated over system 100 can be transmitted in various forms such as email, internet links, digital messaging, graphic messaging, video messaging, audio messaging, text messaging, SMS messaging, etc.

Service provider device 102 and opportunity provider device 106 can include a processor and associated circuitry to execute or direct the execution of computer-readable instructions to obtain information. Devices 102, 106 can retrieve and execute software from storage, which can include a disk drive, a flash drive, memory circuitry, or some other memory device, and which can be local or remotely accessible. The software includes computer programs, firmware, or some other form of machine-readable instructions, and may include an operating system, utilities, drivers, network interfaces, applications, or some other type of software, including combinations thereof. Devices 102, 106 can receive instructions and other input at a user interface. In an exemplary embodiment, the user interface of devices 102, 106 can include various peripherals such as a display, a keyboard, a mouse, a printer, etc., where at least one peripheral can be used to input the instructions associated with communications over the system 100.

Service provider device 102 can be associated with a service provider such as any individual that provides services to a company, agency, organization, or individual. The service provider can perform work on a temporary, contract, term, and/or project basis. In an exemplary embodiment, the service provider can include knowledge workers, independent consultants, free agents, freelancers, contractors, information technology worker, political staffers, healthcare aides, medical workers, teachers, lawyers, accountants, professors, authors, hair stylists, bookkeepers, couriers, court reporters, engineers, entertainers, massage therapists, personal trainers, sale representatives, ride-sharing participants, tradesman, service industry workers, etc.

Opportunity provider device 106 can be associated with any individual or entity tasked with the responsibility of finding, hiring, engaging, and/or procuring the services of a service provider. The opportunity provider device 106 can be associated with a direct opportunity provider or an opportunity provider agent.

Network node 104 can be any network node configured to facilitate direct or indirect bi-directional communication between service provider device 102 and opportunity provider device 106. Node 104 can be a standalone computing device, computing system, or network component, and can be accessible, for example, by a wired or wireless connection, or through an indirect connection such as through a computer network or communication network. Alternatively, node 104 can be an adjunct or component of any other network element within system 100 such as devices 102, 106. Network node 104 can further include one or more data bases to store information associated with each service provider and/or opportunity provider.

Node 104 can include a processor and associated circuitry to execute or direct the execution of computer-readable instructions to obtain information. Node 104 can retrieve and execute software from storage, which can include a disk drive, a flash drive, memory circuitry, or some other memory device, and which can be local or remotely accessible. The software includes computer programs, firmware, or some other form of machine-readable instructions, and may include an operating system, utilities, drivers, network interfaces, applications, or some other type of software, including combinations thereof. Node 104 can receive instructions and other input at a user interface.

In operation, system 100 can provide a two-way authentication procedure which allows a service provider to receive communications associated with a potential opportunity provided by an opportunity provider. In order for the service provider to receive the communications associated with potential opportunities, the opportunity provider first verifies and/or confirms an association with the service provider. This association can be based on a previous affiliation such as a previous engagement associations or work relationships, educational associations (for example, the parties could be current or former classmates, had a former student/ professor relationship, or be alumni from the same school or university, etc.) professional association, social association, or the like. In addition, the service provider must also confirm the association (e.g., confirm the existence of a previous association) with the opportunity provider before the service provider can receive information associated with the opportunity. After both the opportunity provider and the service provider confirm the association, the information associated with the opportunity can be transmitted from the opportunity provider to the service provider. The information associated with the opportunity is not transmitted to the service provider until the authorizations from the opportunity provider and the authorization from the service provider are received.

In an exemplary embodiment, an interface can be displayed on the service provider device 102 and/or opportunity provider device 106 to facilitate the communication between the service provider device 102 and the opportunity provider device 106. For example, the interface can include a request for authentication information such as user name, password, identity information, authentication keys, certificates, etc. The opportunity provider inputs personal authentication information associated with the opportunity provider at the opportunity provider device 106 through the interface. The opportunity provider then identifies one or more specific service providers to include within a network. For example, the opportunity provider can identify service providers using contact information such as phone numbers, personal email addresses, company email addresses, etc. An indication can be sent from the opportunity provider device 106 to the network node 104 where the indication includes information associated with the identification of service providers. Network node 104 can generate a message to each identified service provider based on the indication of identification of service providers from the opportunity provider device 106 through the interface. The network node 104 then sends a message to each identified service provider device such as service provider device 102 through the interface where the message includes an invitation to join the opportunity provider's network. The service provider can access the system 100 over an interface at the service provider device 102, where authentication information such as user name, password, identity information, authentication keys, certificates, etc., can be provided by the service provider. In addition, the service provider can authenticate the previous affiliation between the service provider and the opportunity provider through the interface on the service provider device 102.

In another exemplary embodiment, the service provider can provide an indication of status and/or availability such that the opportunity can be transmitted to the service provider based on the service provider's status and/or availability. A service provider's status is related to whether or not the service provider is able to provide services to a company, agency, organization, or individual. Availability is related to an amount of capacity the service provider has to provide services to a company, agency, organization, or individual. Capacity can be based on an amount of time a service provider is able to provide services to a company, agency, organization, or individual. The service provider's availability can be provided in various increments such as daily, hourly, weekly, and/or monthly increments including a designation of full-time or part-time availability. Availability can further include at least one of a predetermined duration, a start and/or end date, a length of assignment indication, and/or a future availability indication. In addition to filling a current opportunity, the service provider's availability can be used by the opportunity provider to forecast for future temporary, contract, term, and/or project opportunities.

Figure 2:
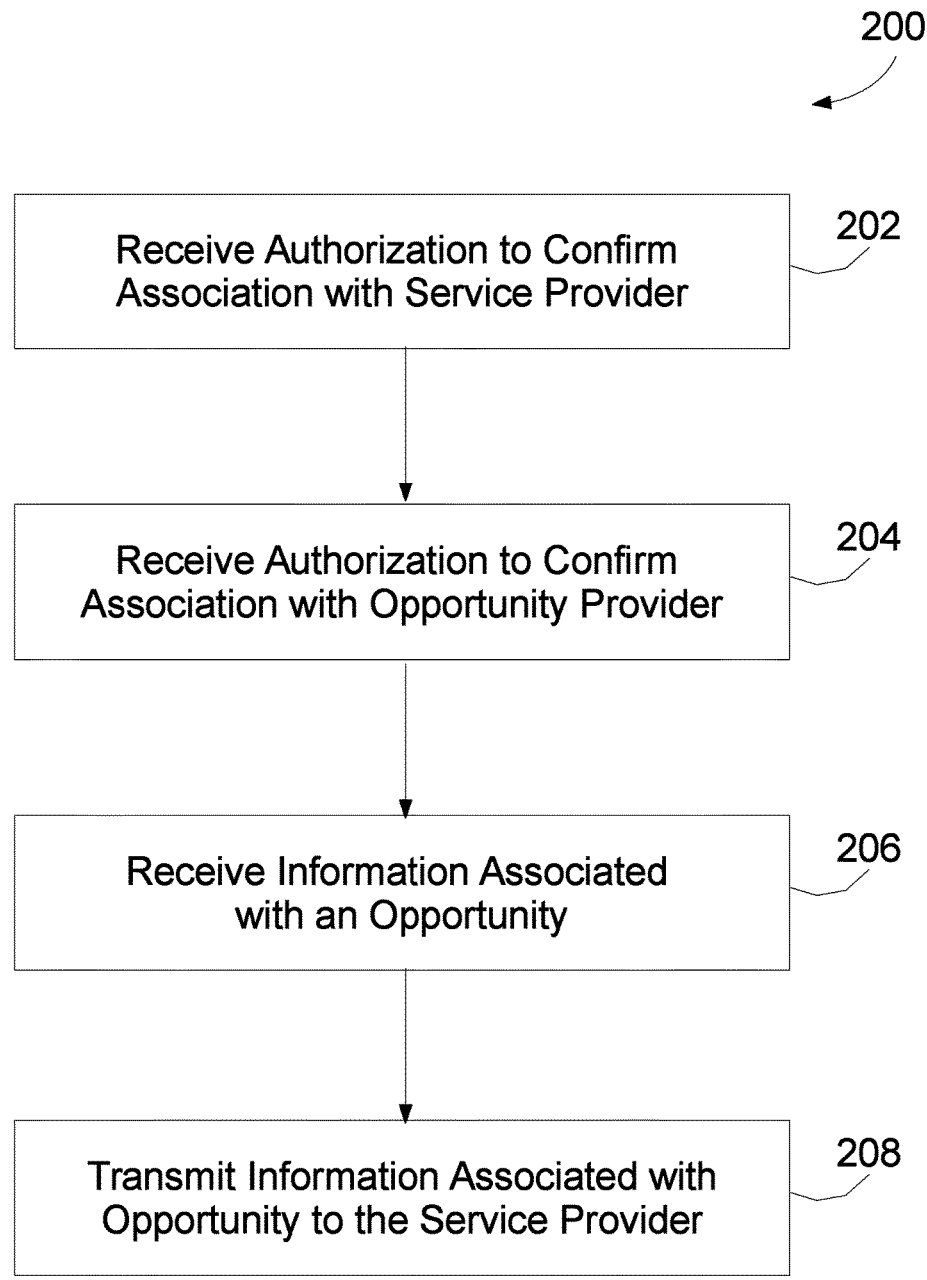
FIG. 2 illustrates an exemplary method of communication between an opportunity provider and a service provider.

FIG. 2 illustrates a flow chart of an exemplary method 200 for communicating between an opportunity provider and a service provider. The method will be discussed with reference to the exemplary communication system 100 illustrated in FIG. 1. However, the method can be implemented with any suitable communication system. In addition, although FIG. 2 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

Information and/or data associated with a service provider can be input at the service provider device 102. For example, the information and/or data can include at least one of the individual's name, sex, age, contact information such as address, email address, phone number, etc., user name, password, educational information, work experience, work history, skills, work-related skills, certifications, past employers, references, referrals, salary history, salary requirements, benefit requirements, location preferences, work environment preferences, licenses, ability to drive, technical competencies, conflict of interest, background checks, bill rate, availability, clearances, salary requirements, pay rate, hourly requirements (min/max), ability to travel, past working relationships, job requirements and specifications, compensation preferences, personal credit information and history, association memberships, work samples, transcripts, an identification of roles in prior projects (e.g., project manager, program manager, technical developer, etc.), an identification of a preference of role(s) for future project, and/or any other relevant or pertinent information. The information associated with the service provider can be stored at the service provider device 102. Alternatively, the information associated with the service provider can be transmitted to and stored in a database at network node 104.

At 202, an authorization can be received to confirm an association with a service provider. For example, a user such as an opportunity provider can provide an authorization at the opportunity provider device 106 such that the authorization is transmitted to the network node 104. The authorization can confirm an association with an identified service provider. The authorization can identify a service provider using at least two of a name, a phone number, a personal email address, a company email address, etc.

An authorization can be received to confirm an association with the opportunity provider at 204. For example, network node 104 can generate an invitation to the identified service provider and send an invitation to join the opportunity provider's network to service provider device 102. The service provider confirms an association between the opportunity provider and the service provider by accepting the invitation to join the opportunity provider's network. An authorization accepting the invitation and confirming the association with the opportunity provider is sent from the service provider device 102 to the network node 104.

In an exemplary embodiment, the authorization confirming an association with the service provider and the authorization confirming an association with the opportunity provider can include an identification, a virtual business card, an encryption key, a security certificate, etc. Various details regarding the relationship between the service provider and the opportunity provider can be included. For example, the authorization can further include an indication of how long a relationship between the service provider and the opportunity provider has existed. The association between the opportunity provider and the service provider can be based on a previous affiliation such as a previous engagement association, educational association, social network association, or professional organization association.

At 206, information associated with an opportunity can be received. For example, the network node 104 can receive information associated with a temporary, contract, term, and/or project opportunity where the information is input using the opportunity provider device 106. Information associated with an opportunity can include a description of services that are needed to be performed for a company, agency, organization, or individual. The opportunity can further include a description of the context in which the services are to be performed. For example, the opportunity can include a description of the type of project in which the services will be performed, the type of work environment, skills implemented, training, etc. In an exemplary embodiment, the information associated with the opportunity can include at least one of: an opportunity provider name, a company name, opportunity offering, project or assignment requirement, project or assignment description, project role, technical skills/requirements, technical skill level (e.g., beginner, novice, expert, etc.), technical competencies or experience, years of experience, certification requirements, clearance requirements, citizenship requirements, state date, end date, length of assignment, job offering, position to be filled, company size, company location, regional location, number of employees, employee benefits offered, company history, salary or pay rate information, compensation information, customer information, supplier information, information from past employees, information from current employees, past or current employment agencies or recruiters, types of positions such as permanent or temporary positions, references, pictures of facilities, video clips, work hours, work requirements, recommendation letters, salary, alternative compensation information, etc.

In an exemplary embodiment, information associated with an opportunity can be stored, for example, at opportunity provider device 106 and/or network node 104 thereby allowing an opportunity provider to reuse the information associated with an opportunity in the future. In addition, a glossary of terms, skills, qualifications, etc. can be created such that terminology can be used universally throughout the network. For example, a library of templates can be created to allow an opportunity provider to select a predetermined template to prepare an opportunity description.

Information associated with the opportunity can be transmitted to the service provider at 208. For example, the network node 104 can transmit the information associated with the opportunity from the opportunity provider to the service provider based on the authorization from the opportunity provider and the authorization from the service provider. The information associated with the opportunity is not transmitted to the service provider device 102 until the authorization from the opportunity provider and the authorization from the service provider are received at the network node 104.

In an exemplary embodiment, an indication of availability associated with the service provider can be received from the service provider device 102 wherein the information associated with the opportunity is transmitted based on the authorization from the opportunity provider, the authorization from the service provider, and the availability of the service provider. The availability associated with the service provider can be provided in various increments such as daily, weekly, monthly, quarterly, etc. In addition, an indication of part-time or full-time preferences can be included in the availability information. The availability information can be transmitted to the network node 104 and provided to the opportunity provider device 106 such that the opportunity provider can use the service provider's availability to forecast future temporary, contract, term, and/or project opportunities. In an exemplary embodiment, an opportunity provider can use the availability information for planning purposes, virtual team building, product team sourcing, etc.

Periodic communications can be sent to the service provider device 102 and the opportunity provider device 106. One periodic communication can prompt the service provider to update availability information. Another periodic communication can prompt the opportunity provider to update information associated with the opportunity. The periodic communications can be sent at predetermined time intervals, such as every thirty days. In an exemplary embodiment, when a service provider's availability information has not been updated within a predetermined time period, the service provider can be prevented from receiving opportunities sent from opportunity providers.

Figure 3:
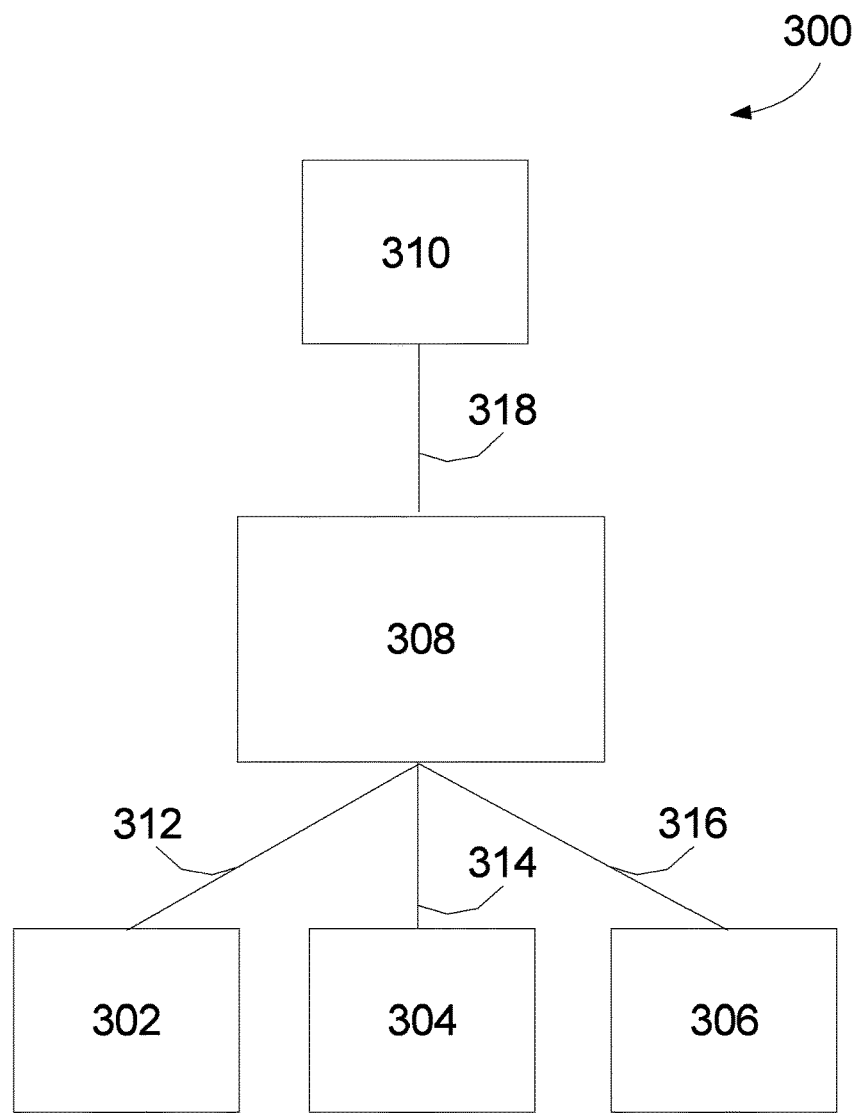
FIG. 3 illustrates an exemplary system for communicating between an opportunity provider and a plurality of service providers.

FIG. 3 illustrates a system 300 for establishing communication between an opportunity provider and a plurality of service providers. The system 300 can include service provider devices 302, 304, 306, a network node 308, and an opportunity provider device 310. While three service provider nodes 302, 304, 306 and one opportunity provider node 310 are illustrated, system 300 can include any number of service provider devices 302, 304, 306 and/or opportunity provider devices 310. In addition, other network elements may be present to facilitate communication within system 300 which are omitted for clarity, including processing nodes, routers, gateways, and physical and/or wireless data links for carrying data among the various network elements.

Service provider devices 302, 304, 306 and/or opportunity provider device 310 can be any device configured to communicate over system 300 using a communication interface. For example, the service provider devices 302, 304, 306 and/or opportunity provider device 310 can be a wired or wireless device such as a computing platform including a personal computer, a laptop, a mobile device such as a smart phone or a tablet, a remote terminal unit, or any other internet accessible device, and combinations thereof.

The service provider device 302 can transmit and/or receive information from node 308 over communication link 312. The service provider device 304 can transmit and/or receive information from node 308 over communication link 314. The service provider device 306 can transmit and/or receive information from node 308 over communication link 316. The opportunity provider device 310 can transmit and/or receive information from node 308 over communication link 318. Communication links 312, 314, 316, 318 can use various communication media, such as air, space, metal, optical fiber, or some other signal propagation path—including combinations thereof.

The interface of the service provider devices 302, 304, 306 and opportunity provider device 310 can include one or more transceivers for transmitting and receiving data over communication system 300. In an exemplary embodiment, each device 302, 304, 306, 310 can include a transceiver associated with at least one wireless protocol, at least one wired protocol, and/or other type of communication protocol.

Service provider devices 302, 304, 306 and the opportunity provider device 310 can communicate information over system 300 using various communication services. For example, information communicated over system 300 can be transmitted in various forms such as email, internet links, digital messaging, graphic messaging, video messaging, audio messaging, text messaging, SMS messaging, etc.

Service provider devices 302, 304, 306 and opportunity provider device 310 can include a processor and associated circuitry to execute or direct the execution of computer-readable instructions to obtain information. Devices 302, 304, 306, 310 can retrieve and execute software from storage, which can include a disk drive, a flash drive, memory circuitry, or some other memory device, and which can be local or remotely accessible. The software includes computer programs, firmware, or some other form of machine-readable instructions, and may include an operating system, utilities, drivers, network interfaces, applications, or some other type of software, including combinations thereof. Devices 302, 304, 306, 310 can receive instructions and other input at a user interface. In an exemplary embodiment, the user interface of devices 302, 304, 306, 310 can include various peripherals such as a display, a keyboard, a mouse, a printer, etc., where at least one peripheral can be used to input the instructions associated with communications over the system 300.

Service provider devices 302, 304, 306 can be associated with a service provider such as any individual that provides services to a company, agency, organization, or individual. The service provider can perform work on a temporary, contract, term, and/or project basis. In an exemplary embodiment, the service provider can include knowledge workers, independent consultants, free agents, freelancers, contractors, information technology workers, healthcare aids, medical workers, lawyers, accountants, teachers, lawyers, professors, authors, hair stylists, bookkeepers, couriers, court reporters, engineers, entertainers, massage therapists, personal trainers, sale representatives, a ride-sharing participant, tradesman, service industry workers, political staffers, etc.

Opportunity provider device 310 can be associated with any individual or entity tasked with the responsibility of finding, hiring, engaging, and/or procuring the services of at least one service provider. The opportunity provider device 310 can be associated with a direct opportunity provider or an opportunity provider agent.

Network node 308 can be any network node configured to facilitate direct or indirect bi-directional communication between service provider devices 302, 304, 306 and opportunity provider device 310. Node 308 can be a standalone computing device, computing system, or network component, and can be accessible, for example, by a wired or wireless connection, or through an indirect connection such as through a computer network or communication network. Alternatively, node 308 can be an adjunct or component of any other network element within system 300 such as devices 302, 304, 306, 310.

Node 308 can include a processor and associated circuitry to execute or direct the execution of computer-readable instructions to obtain information. Node 308 can retrieve and execute software from storage, which can include a disk drive, a flash drive, memory circuitry, or some other memory device, and which can be local or remotely accessible. The software includes computer programs, firmware, or some other form of machine-readable instructions, and may include an operating system, utilities, drivers, network interfaces, applications, or some other type of software, including combinations thereof. Node 308 can receive instructions and other input at a user interface.

In operation, system 300 can allow an opportunity provider to communicate an opportunity to at least one of a plurality of service providers based on the status or availability of the plurality of service providers. For example, users such as service providers can input an availability or status information at an associated service provider device 302, 304, 306. An opportunity can include information associated with a description of services that are needed to be performed for a company, organization, or individual. The opportunity can further include a description of the context in which the services are to be performed. The availability or status information can include various time increment availabilities such as daily, weekly, monthly increments or the like. The availability information can further include an indication of schedule preference such as full-time or part-time, evenings or weekends. In addition, the availability information can further include an indication of the types of projects that the service provider would prefer including an indication of geographic location preference, skill implementation preference, shift preferences or ability to work evenings or weekends, work environment preference, company culture preference, etc. The availability or status information can be transmitted from the service provider devices 302, 304, 306 to the network node 308. The availability information from the plurality of service provider devices 302, 304, 306 can be aggregated at the network node 308 to produce an interface that allows an opportunity provider to view the availability or status of the plurality of service providers at the opportunity provider device 310. In an exemplary embodiment, the interface can be a single page displaying the availability information associated with the plurality of service providers in a dashboard type interface (e.g., each of the plurality of service provider's availability on a single page). The dashboard type interface can display the information in various forms such as through color association (e.g., red for not available, yellow for limited availability, and green for full availability) or by a graphic, image, and/or character representation. An opportunity provider selects a service provider to initiate communication with and/or to send a job opportunity through system 300 based on the availability information displayed at the opportunity provider device 310. For instance, the opportunity provider can send an indication of an opportunity through system 300 to service provider device 302 when the service provider associated with device 302 provides availability information that matches the opportunity requirements. Alternatively, the opportunity provider can send an indication of an opportunity through system 300 to a plurality of service provider devices such as 302, 304 but not all service provider devices such as 306, when the availability associated with the service provider devices 302, 304 is within a threshold and the availability of the service provider associated with device 306 is outside the predetermined availability threshold.

In an exemplary embodiment, an opportunity provider associated with opportunity provider device 310 can communicate one or more opportunities to one or more service providers associated with service provider devices 302, 304, 306 through system 300. The opportunity can be identified as an open opportunity or a closed opportunity. An open opportunity can be communicated to every member of the opportunity provider's network. A closed opportunity can be specifically directed at one or more service providers identified by the opportunity provider.

When a service provider receives a plurality of opportunities from the opportunity provider, the opportunities can be ranked based on factors previously identified by the service provider at the associated service provider device such as device 302. For example, when a service provider identifies a specific skill requirement as a priority, all opportunities that include that specific skill requirement will be prioritized in a listing provided at the service provider device 302 to allow the service provider to quickly identify relevant opportunities from a plurality of opportunities provided from the opportunity provider. In another exemplary embodiment, when the opportunity is sent to a plurality of service providers from the opportunity provider, the responses from the service providers responding to the opportunity can be ranked and displayed in order of prioritization at the interface of the opportunity provider device 310 based on previously identified variables such as work experience, skill qualifications, etc.

In an exemplary embodiment, the availability or status information can be monitored in real time. For example, the dashboard representing the availability of the plurality of service providers can be updated after at least one of the service providers updates status information at the service provider device such as device 302.

In another exemplary embodiment, when no previous authentication between at least one opportunity provider and a service provider exists, network node 308 can suggest a connection based on previously defined preferences of the opportunity provider and the at least one service provider. For example, an opportunity provider can define an opportunity using an interface at the opportunity provider device 310. The opportunity can include various factors including at least one of a set of criteria associated with desired skills, previous work experiences, availability, location requirements, travel requirements, work arrangements, pay rate information, etc. The opportunity provider can identify and rank the various factors. For example, when the opportunity provider indicates that specific skills are required, those skills can be given priority within the ranked list. Alternatively, if training is possible thereby making specific skills less important, the opportunity provider can identify other factors such as travel requirements or pay rate as the priority. In addition, the opportunity provider can identify an acceptable gap range threshold between the priorities within the ranked list and a service provider's profile information such that service providers that are within the acceptable gap range are identified. The gap range can be a range of values that the opportunity provider has indicated are an acceptable deviation from a desired priority value.

When the service provider provides profile information, each service provider can rank and prioritize various factors that would make an opportunity more attractive to the service provider. For example, if a service provider would prefer to work remotely, the service provider can identify that work environment as the priority. Alternatively, if a service provider would prefer to use specific skills, the service provider can identify those specific skills as the priority.

Based on the opportunity identified at opportunity provider device 310 and the preferences identified by each service provider, the network node 308 searches at least one of a plurality of service providers' profiles to determine whether each service provider is within the acceptable gap range. In an exemplary embodiment, the information associated with the service provider can be configured to be stored as a profile. Numerous profiles are created based on the information associated with the service provider including a basic profile, a secondary profile, and an enhanced profile. A basic profile includes fundamental information such as name, current job information including an identification of the company or organization, responsibilities, etc., and three work-related skills previously identified by the service provider. For instance, when the service provider is an information technology consultant, the service provider can identify skills and/or technical certifications such as MICROSOFT, JAVA, ORACLE, INFORMATICA, PEOPLESOFT, SAP, database administration, requirements analysis, software architecture, network security, etc. or roles such as: developer, network administrator, systems architect, software analyst, quality assurance tester, subject matter expert, etc. A health care aide or medical worker can identify specialties such as obstetrics, emergency room, general surgery, pediatrics, physician assistant (PA), certified nursing assistant (CNA), licensed practical nurse (LPN), registered nurse (RN), etc. A lawyer can identify different subject matter such as litigation, civil matters, intellectual property, domestic matters, etc.

A secondary profile includes more detailed information than the fundamental information but still restricts the amount of information included within the profile. For example, the secondary profile can display detailed information associated with the service provider's recent work history and qualifications. For instance, the secondary profile can include a detailed work history or project experience for a predetermined time period, such as the previous five years, educational background, a complete list of work-related skills, all certifications, licenses, required training, accolades, clearances, and association memberships.

An enhanced profile includes all of the information included in the secondary profile as well as additional information that would allow an opportunity provider to determine whether to send an opportunity to the service provider. For example, the enhanced profile can include preferences and requirements previously identified by the service provider such as pay rate, hourly requirements, travel preferences, work environment preferences, assignment preferences, availability, a part-time or full-time designation, hourly requirements, project preferences, skill preferences, etc. In addition, the enhanced profile includes information to allow the person seeing the enhanced profile to directly contact the service provider such as phone number, personal email, company email, etc. The enhanced profile can further include references, referrals, work samples, transcripts, etc.

When network node 308 performs a search of the service providers' profiles, the type of profile (basic, secondary, enhanced) available for searching is a preference set by each service provider. The preference can be based on whether the service provider is within the opportunity provider's network. For example, when the service provider is not within the opportunity provider's network, the service provider can identify that only a basic profile can be searched. Alternatively, a service provider can identify that the basic profile and the secondary profile can be searched when the service provider is not within the opportunity provider's network. The preference can be further based on the service provider's availability. For example, when the service provider has a greater availability (e.g., more time to become engaged in providing services) such as greater availability to work additional hours, the service provider can designate that the basic and secondary profiles can be used during a search.

The search performed by network node 308 can be performed at various intervals. For example, the search to identify service providers that match the opportunity provided by the opportunity provider can be performed once. Alternatively, the opportunity provider can indicate that the search is to be performed on a persistent and/or on-going basis such that whenever a service provider updates profile information or a new service provider joins system 300, a new search is performed.

When network node 308 identifies service providers that are within the acceptable gap range, the network node 308 can transmit an indicator to each identified service provider's device indicating that the associated service provider meets the criteria of an opportunity associated with an opportunity provider in which the service provider is not currently a member of the opportunity provider's network. The indicator can include an inquiry whether the service provider would like information associated with the service provider to be transmitted to the opportunity provider. When the service provider declines providing further information to the opportunity provider, the opportunity provider is not notified of the identified service provider. In other words, the opportunity provider never becomes aware that a match was identified.

When the service provider approves further information associated with the service provider to be transmitted to the opportunity provider, the basic profile of the service provider is transmitted to the opportunity provider. The opportunity provider reviews the basic profile of the service provider to decide whether to transmit the opportunity to the service provider. When the opportunity provider determines to transmit the opportunity to the service provider, network node 308 transmits an authorization request to the service provider to join the opportunity provider's network. The authorization request can include opportunity provider profile information such as name, company or organization association, a list of members within the service provider's network that are currently within the opportunity provider's network, etc. Only after the service provider approves and authorizes to join the opportunity provider's network will the opportunity be transmitted to the service provider. When the service provider decides to pursue the opportunity, the service provider can transmit an indication that the enhanced profile can be sent to the opportunity provider for further consideration.

When more than one service provider is identified as meeting the criteria of the opportunity, the list of service providers that meet the criteria is presented to the opportunity provider. The list can be presented based on the ranked variables identified by the opportunity providers. In addition, the list can be manipulated using a filter defined by the opportunity provider. Alternatively, a plurality of service providers and associated profile information can be provided to the opportunity provider such that a side by side comparison between the plurality of service providers can be performed. The opportunity provider can select to send only one service provider a request to join the opportunity provider's network or the opportunity provider can send a request to join the opportunity provider's network to all of the service providers identified.

In an exemplary embodiment, the query can be persistent such that the opportunity criteria and the availability criteria are continually compared with profile and availability information. When a service provider updates any information associated with the profile or availability information and the new information now meets the opportunity criteria and/or the availability criteria, the opportunity provider can be notified. For example, after it is determined that the new service provider meets the opportunity criteria, an availability score can be determined for the new service provider based on the availability information associated with the new provider and the availability criteria. A notification can be transmitted to the opportunity provider that the new service provider meets the opportunity criteria. The notification can include only information associated with the new service provider or the notification can include a new ranked list of service providers including all of the previously ranked service providers and the new service provider.

The opportunity provider can select any service provider based on the displayed information associated with the ranked service providers. For example, the opportunity provider can select the service provider using a button or other graphical interface indication. After the selection indication is received, information associated with an opportunity can be transmitted to the selected service provider.

Figure 4:
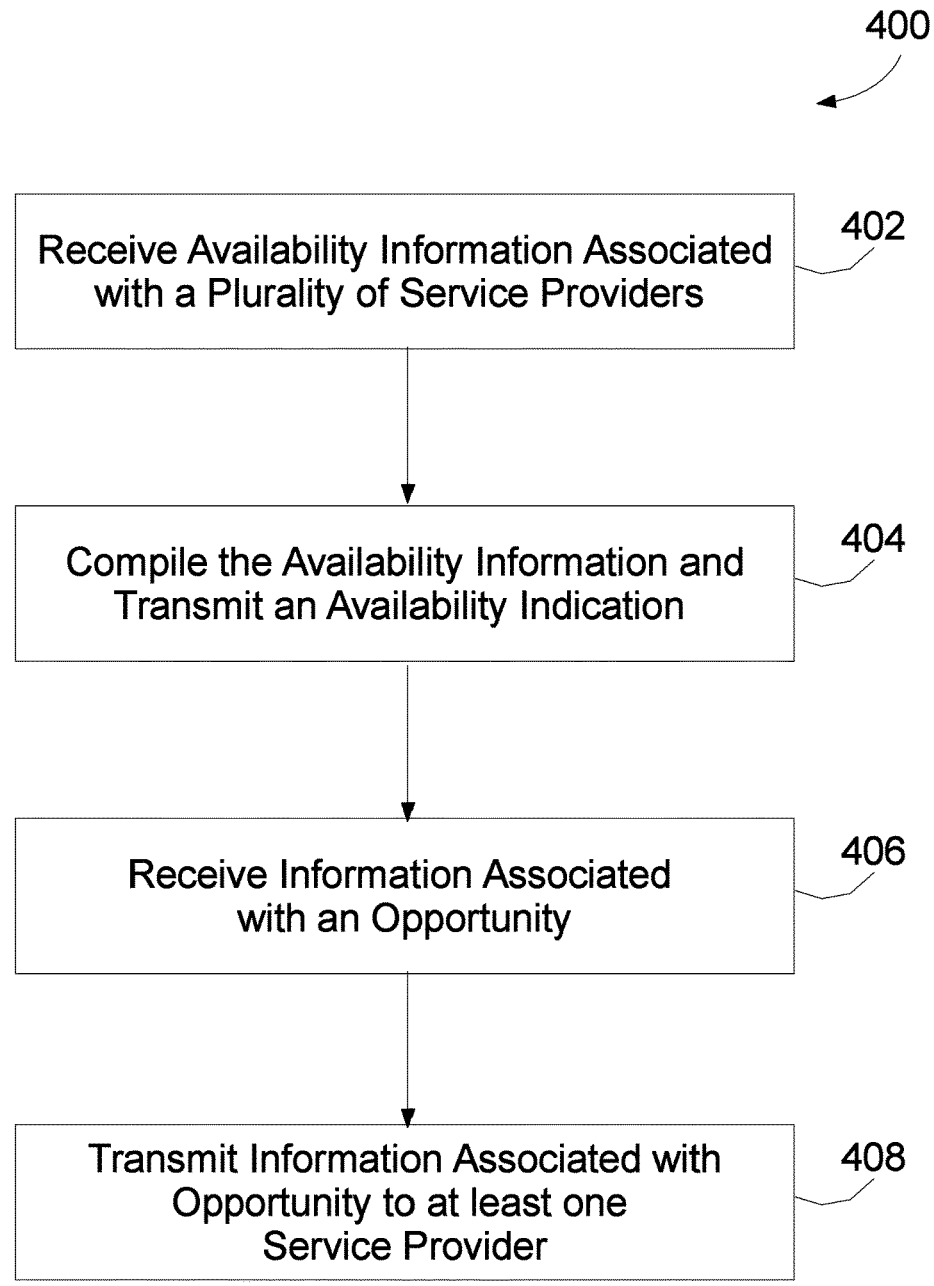
FIG. 4 illustrates an exemplary method of communication between an opportunity provider and a plurality of service providers.

FIG. 4 illustrates a flow chart of an exemplary method 400 for communicating between an opportunity provider and a plurality of service providers. The method will be discussed with reference to the exemplary communication system 300 illustrated in FIG. 3. However, the method can be implemented with any suitable communication system. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 402, availability information associated with a plurality of service providers can be received. For example, service providers can input availability or status information at a corresponding service provider device 302, 304, 306. The information can be transmitted over system 400 to the network node 308.

In an exemplary embodiment, one or more service providers can input profile information and availability information at the respective devices 302, 304, 306. Profile information can include at least one of a service provider name, sex, contact information, user name, password, educational information, work experience, work history, skills, work-related skills, certifications, past employers, references, referrals, salary history, technical competencies, an identification of conflict of interest, background check, pay rate, clearances, ability to travel, past working relationships, personal credit information and history, association memberships, resume information, work samples, transcripts, previous roles in prior projects, citizen information including visa or sponsorship information. The availability information can be based on at least one of a schedule of availability, an indicator of capacity, and a full-time/part-time indication. For example, a schedule of availability can include various increments of time such as hours, days, weeks, months, quarters, etc. An indicator of capacity can include an indication of the total time available, an indication of an amount of time already engaged, and/or an indication of an amount of time the service provider is available to be engaged to provide services. A full-time/part-time indication can be an indication such as a graphic or interactive element or it could be associated with a time indication where a full-time indication corresponds to a work week including forty or more hours and a part-time indication corresponds to a work week including less than forty hours. The profile information and availability information can be stored in a database at network node 308.

In an exemplary embodiment, a query associated with an opportunity provider can be received. For example, network node 308 can receive the query from the opportunity provider device 310. The query can be based on an opportunity criteria and an availability criteria. The opportunity criteria can be based on at least one of a skill requirement and a technical competency requirement. For instance, the skill requirement can be associated with the skills necessary to carry out the requirements of the opportunity. The technical competency requirement can be associated with knowledge and/or training necessary to carry out the requirements of the opportunity. The availability criteria can be based on an indication of desired availability of a service provider determined by the opportunity provider where the availability criteria includes at least one of an increment in days, weeks, months, and a full-time/part-time indication. For example, the indication of desired availability can be based on a minimum or maximum time increment to perform the services for the company or organization, such as at least 30 hours per week.

The availability information can be compiled and an availability indication transmitted at 404. For example, network node 308 can compile the availability information from the plurality of service provider devices 302, 304, 306 to create a single availability indication corresponding to all of the service providers' availability to opportunity provider device 310. The indication corresponding to all of the service providers' availability can have various forms. For example, the indication corresponding to all of the service providers' availability can represent a single interface to be displayed on the opportunity provider device 310 such that the single interface is in a dashboard format where an opportunity provider can view the availability of all service providers within the single interface. In addition, the availability indication can be updated in real time based on availability information provided by each service provider.

In an exemplary embodiment, the opportunity criteria and the availability criteria associated with the query can be compared with the profile information and availability information of all of the service providers at the network node 308. The network node 308 can determine whether each service provider meets the opportunity criteria based on the profile information of each provider. For example, a profile of a first service provider can be compared with the opportunity criteria of the query. When the opportunity criteria overlaps or is within a predetermined range of criteria, it can be determined that the first service provider meets the opportunity criteria. When the opportunity criteria does not overlap or is outside a predetermined range of criteria, it can be determined that the first service provider does not meet the opportunity criteria.

For each service provider that meets the opportunity criteria, an availability score can be determined. For instance, when a first and second service provider meet the opportunity criteria, a first availability score can be calculated based on the availability information associated with the first service provider and the availability criteria of the query and a second availability score can be calculated based on the availability information associated with the second service provider and the availability criteria of the query.

After each availability score is calculated, the service providers can be ranked based on the availability score. For example, a rank of the first service provider and the second service provider can be determined based on the first availability score and the second availability score. When the first availability score is greater than the second availability score, the first service provider is ranked higher than the second service provider. When the second availability score is greater than the first availability score, the second service provider is ranked higher than the second service provider. It is noted that it is possible for not all of the service providers to meet the opportunity criteria and thus not be included when determining availability score and rank of the service providers.

The network node 308 can then transmit instructions to the opportunity provider device 310 to display information associated with each ranked service provider. For example, display information including various elements such as texts, characters, graphics, etc., associated with each service provider can be transmitted to the opportunity provider device 310 according to the determined rank of all of the service providers.

In another exemplary embodiment, each service provider can further provide preference information. For instance, the network node 308 can receive preference information associated with individual service providers. Preference information can be based on at least one of: a skill implementation preference, a skill acquisition preference, a location preference, a work environment preference, a pay rate preference, a software preference, a delivery preference, a project role preference, a team preference, a project lead preference, a project preference, a company or organization preference, a travel preference, and a training or education preference. In addition, the query can further include a preference criteria.

A preference score can be calculated based on the preference information associated with each service provider and a preference criteria of the query. For example, a first preference score associated with the first service provider can be calculated based on the preference information associated with the first service provider and the preference criteria of the query. A second preference score associated with the second service provider can be calculated based on the preference information associated with the second service provider and the preference criteria of the query.

Each service provider can be ranked based on the respective availability scores and the preference score. The availability scores can be weighted differently from the preference scores during the ranking process. For example, the availability scores can be weighted greater than or less than the preference scores. In an exemplary embodiment, when the first availability score is greater than the second availability score and the first preference score is greater than the second preference score, the first service provider can be ranked higher than the second service provider. When the second availability score is greater than the first availability score and the second preference score is greater than the first preference score, the second service provider can be ranked higher than the first service provider. When the first availability score is greater than the second availability score and the second preference score is greater than the first preference score, the first service provider can be ranked higher than the second service provider. Alternatively, when the first availability score is greater than the second availability score and the second preference score is greater than the first preference score, the second service provider can be ranked higher than the first service provider.

In another exemplary embodiment, an additional trust or credibility score can be determined and used to rank the service providers. For example, the trust or credibility score can be based on at least one of various identification information (name, address, phone number, email, etc.), network score (ratings, connections, endorsements, etc.), work history (verification of project, clients, employer history, etc.), skill verification, education verification, security clearance verification, citizenship verification, visa status verification, sponsorship verification and/or verifications of professional certifications or licenses. In addition, the identification information can further influence the trust or credibility score when the identification information has been independently verified such as through a neutral third party, using publicly available records, from the verification or certification issuing entity, or through an educational entity. For example, a service provider whose information has been verified can be ranked higher than a service provider whose information has not been verified. This trust or credibility score can then be used in addition to or as an alternative of the preference score when determining the rank of the service providers.

At 406, information associated with an opportunity can be received. For example, network node 308 can receive an indication associated with an opportunity from the opportunity provider device 310 where the indication associated with the opportunity is based on the availability information associated with the plurality of service providers. The indication can be associated with one or more of the service providers.

Information associated with the opportunity can be transmitted to at least one of the service provider devices at 408. For example, an indication of the opportunity can be sent to one or more of the service provider devices 302, 304, or 306 based on the information received from the opportunity provider device 310.

The information associated with the opportunity can be transmitted to more than one service provider device 302, 304, 306 simultaneously and/or sequentially. For example, the opportunity provider can indicate that the opportunity is to be sent to all service provider devices 302, 304, 306 at the same time. Alternatively, the opportunity provider can identify and rank the service provider devices such that the opportunity is sent to a first service provider device 302. If the service provider associated with device 302 declines the opportunity, the network node 308 can automatically send the opportunity to the next service provider device identified by the opportunity provider. This process is repeated until a service provider accepts the opportunity and requests additional information. The network node 308 then transmits an indication to the opportunity provider device 310 identifying which service provider approved the opportunity and requested additional information.

Figure 5:
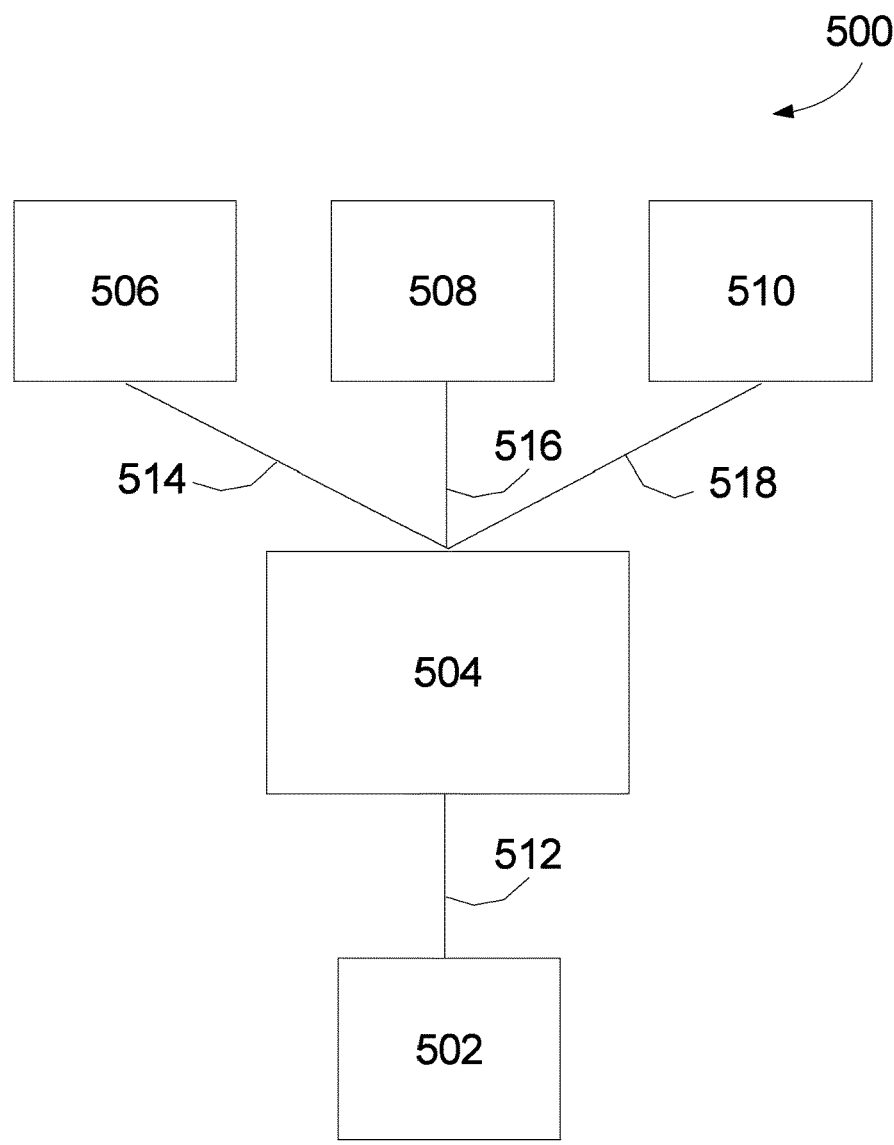
FIG. 5 illustrates an exemplary system for communicating between a plurality of opportunity providers and a service provider.

FIG. 5 illustrates a system 500 for establishing communication between a plurality of opportunity providers and a service provider. The system 500 can include a service provider device 502, a network node 504, and a plurality of opportunity provider devices 506, 508, 510. While three opportunity provider devices 506, 508, 510 and one service provider device 502 are illustrated, system 500 can include any number of service provider devices and/or opportunity provider devices. In addition, other network elements may be present to facilitate communication within system 500 which are omitted for clarity, including processing nodes, routers, gateways, and physical and/or wireless data links for carrying data among the various network elements.

Service provider device 502 and/or opportunity provider devices 506, 508, 510 can be any device configured to communicate over system 500 using a communication interface. For example, the service provider device 502 and/or opportunity provider devices 506, 508, 510 can be a wired or wireless device such as a computing platform including a personal computer, a laptop, a mobile device such as a smart phone or a tablet, a remote terminal unit, or any other internet accessible device, and combinations thereof.

The service provider device 502 can transmit and/or receive information from node 504 over communication link 512. The opportunity provider device 506 can transmit and/or receive information from node 504 over communication link 514. The opportunity provider device 508 can transmit and/or receive information from node 504 over communication link 516. The opportunity provider device 510 can transmit and/or receive information from node 504 over communication link 518. Communication links 512, 514, 516, 518 can use various communication media, such as air, space, metal, optical fiber, or some other signal propagation path—including combinations thereof.

The interface of the service provider device 502 and opportunity provider devices 506, 508, 510 can include one or more transceivers for transmitting and receiving data over communication system 500. In an exemplary embodiment, each device 502, 506, 508, 510 can include a transceiver associated with at least one wireless protocol, at least one wired protocol, and/or other type of communication protocol.

Service provider device 502 and the opportunity provider devices 506, 508, 510 can communicate information over system 500 using various communication services. For example, information communicated over system 500 can be transmitted in various forms such as email, internet links, digital messaging, graphic messaging, video messaging, audio messaging, text messaging, SMS messaging, etc.

Service provider device 502 and opportunity provider devices 506, 508, 510 can include a processor and associated circuitry to execute or direct the execution of computer-readable instructions to obtain information. Devices 502, 506, 508, 510 can retrieve and execute software from storage, which can include a disk drive, a flash drive, memory circuitry, or some other memory device, and which can be local or remotely accessible. The software includes computer programs, firmware, or some other form of machine-readable instructions, and may include an operating system, utilities, drivers, network interfaces, applications, or some other type of software, including combinations thereof. Devices 502, 506, 508, 510 can receive instructions and other input at a user interface. In an exemplary embodiment, the user interface of devices 502, 506, 508, 510 can include various peripherals such as a display, a keyboard, a mouse, a printer, etc., where at least one peripheral can be used to input the instructions associated with communications over the system 500.

Service provider device 502 can be associated with a service provider such as any individual that provides services to a company, agency, organization, or individual. The service provider can perform work on a temporary, contract, term, assignment, and/or project basis. In an exemplary embodiment, the service provider can include an independent contractor, freelancer, temporary employee, physician assistant, nurse, attorney, or the like.

Opportunity provider devices 506, 508, 510 can be associated with any individual or entity tasked with the responsibility of finding, hiring, engaging, and/or procuring the series of a service provider. The opportunity provider devices 506, 508, 510 can be associated with a direct opportunity provider or an opportunity provider agent. Network node 504 can be any network node configured to facilitate direct or indirect bi-directional communication between service provider device 502 and opportunity provider devices 506, 508, 510. Node 504 can be a standalone computing device, computing system, or network component, and can be accessible, for example, by a wired or wireless connection, or through an indirect connection such as through a computer network or communication network. Alternatively, node 504 can be an adjunct or component of any other network element within system 500 such as devices 502, 506, 508, 510.

Node 504 can include a processor and associated circuitry to execute or direct the execution of computer-readable instructions to obtain information. Node 504 can retrieve and execute software from storage, which can include a disk drive, a flash drive, memory circuitry, or some other memory device, and which can be local or remotely accessible. The software includes computer programs, firmware, or some other form of machine-readable instructions, and may include an operating system, utilities, drivers, network interfaces, applications, or some other type of software, including combinations thereof. Node 504 can receive instructions and other input at a user interface.

In operation, system 500 allows a plurality of opportunity providers to communicate with a service provider. For example, a plurality of opportunity providers associated with devices 506, 508, 510 can invite the service provider to join the respective opportunity provider's network where each opportunity provider's network is independent and distinct from the others. The service provider authenticates each invitation separately at device 502 and after authentication the service provider can receive information associated with an opportunity from any of the authenticated opportunity providers. In addition, the availability or status information can be communicated to each opportunity provider authenticated by the service provider. It is noted that an opportunity provider can be in communication with system 500 and not be in communication with the service provider associated with device 502.

In an exemplary embodiment, two or more of the opportunity providers can link networks together creating an extended network. For example, a first opportunity provider associated with opportunity provider device 506 and a second opportunity provider associated with opportunity provider device 508 can mutually approve combining the two separate networks. The decision to combine the networks can be based on a relational characteristic such as working for the same company, agency, enterprise or organization. When the two networks are combined, the opportunity providers can share connections. For instance, the service providers that previously authenticated the relationship with the first opportunity provider but have no previous relationship with the second opportunity provider can receive opportunities from the second opportunity provider. Likewise, the second opportunity provider can receive the availability status of each service provider associated with the first opportunity provider. The opportunities and responses to the opportunities can be ranked based on the primary and extended networks. For example, service provider that was linked with the first opportunity provider can receive a list of opportunities where the opportunities from the first opportunity provider are ranked higher than the opportunities from the second opportunity provider. In other words, the ranking is based on the original network and the extended network created when the first opportunity provider and the second opportunity provider linked networks where the original network is associated with the higher ranking.

When the first opportunity provider and the second opportunity provider decide to terminate the combined network, the service providers can return to the original association with the respective opportunity provider. Alternatively, the service providers can remain connected to both the first opportunity provider and the second opportunity provider.

Figure 6:
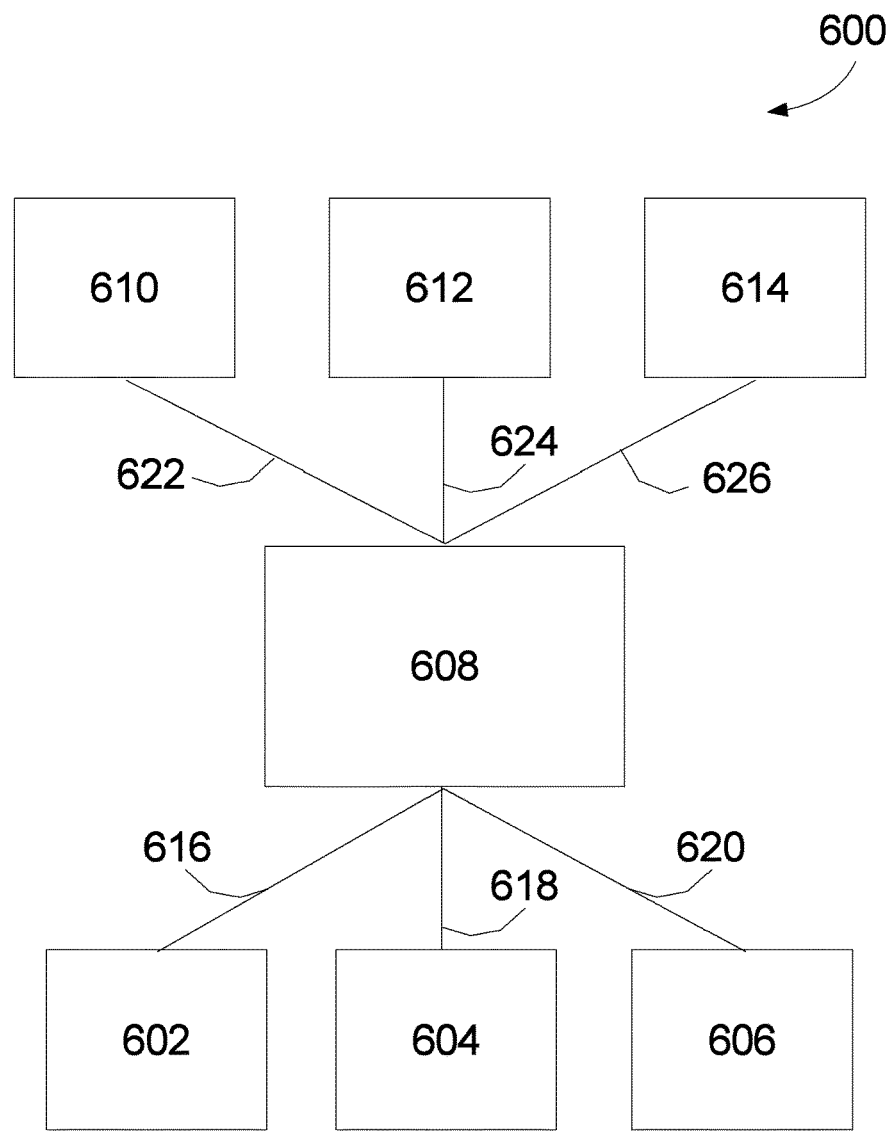
FIG. 6 illustrates an exemplary system for communicating between a plurality of opportunity providers and a plurality of service providers.

FIG. 6 illustrates a system 600 for establishing communication between a plurality of opportunity providers and a plurality of service providers. The system 600 can include service provider devices 602, 604, 606, a network node 608, and a plurality of opportunity provider devices 610, 612, 614. While three opportunity provider devices 610, 612, 614 and three service provider devices 602, 604, 606 are illustrated, system 600 can include any number of service provider devices and/or opportunity provider devices. In addition, other network elements may be present to facilitate communication within system 600 which are omitted for clarity, including processing nodes, routers, gateways, and physical and/or wireless data links for carrying data among the various network elements.

Service provider devices 602, 604, 606 and/or opportunity provider devices 610, 612, 614 can be any device configured to communicate over system 600 using a communication interface. For example, the service provider devices 602, 604, 606 and/or opportunity provider devices 610, 612, 614 can be a wired or wireless device such as a computing platform including a personal computer, a laptop, a palmtop, or a tablet, a personal digital assistant, a remote terminal unit, a cell phone, a smart phone, or any other internet access device, and combinations thereof.

The service provider device 602 can transmit and/or receive information from node 608 over communication link 616. The service provider device 604 can transmit and/or receive information from node 608 over communication link 618. The service provider device 606 can transmit and/or receive information from node 608 over communication link 620. The opportunity provider device 610 can transmit and/or receive information from node 608 over communication link 622. The opportunity provider device 612 can transmit and/or receive information from node 608 over communication link 624. The opportunity provider device 614 can transmit and/or receive information from node 608 over communication link 626. Communication links 616, 618, 620, 622, 624, 626 can use various communication media, such as air, space, metal, optical fiber, or some other signal propagation path—including combinations thereof.

The interface of the service provider devices 602, 604, 606 and opportunity provider devices 610, 612, 614 can include one or more transceivers for transmitting and receiving data over communication system 600. In an exemplary embodiment, each device 602, 604, 606, 610, 612, 614 can include a transceiver associated with at least one wireless protocol, at least one wired protocol, and/or other type of communication protocol.

Service provider devices 602, 604, 606 and the opportunity provider devices 610, 612, 614 can communicate information over system 600 using various communication services. For example, information communicated over system 600 can be transmitted in various forms such as email, internet links, digital messaging, graphic messaging, video messaging, audio messaging, text messaging, SMS messaging, etc.

Service provider devices 602, 604, 606 and opportunity provider devices 610, 612, 614 can include a processor and associated circuitry to execute or direct the execution of computer-readable instructions to obtain information. Devices 602, 604, 606, 610, 612, 614 can retrieve and execute software from storage, which can include a disk drive, a flash drive, memory circuitry, or some other memory device, and which can be local or remotely accessible. The software includes computer programs, firmware, or some other form of machine-readable instructions, and may include an operating system, utilities, drivers, network interfaces, applications, or some other type of software, including combinations thereof. Devices 602, 604, 606, 610, 612, 614 can receive instructions and other input at a user interface. In an exemplary embodiment, the user interface of devices 602, 604, 606, 610, 612, 614 can include various peripherals such as a display, a keyboard, a mouse, a printer, etc., where at least one peripheral can be used to input the instructions associated with communications over the system 600.

Each service provider device 602, 604, 606 can be associated with a service provider such as any individual that provides services to a company, agency, organization, or individual. The service provider can perform work on a temporary, contract, term, and/or project basis. In an exemplary embodiment, the service provider can include an independent contractor, freelancer, temporary employee, legal worker, medical worker or the like.

Each opportunity provider device 610, 612, 614 can be associated with any individual or entity tasked with the responsibility of finding, hiring, engaging, and/or procuring the services of a service provider. The opportunity provider devices 610, 612, 614 can be associated with a direct opportunity provider or an opportunity provider agent.

Network node 608 can be any network node configured to facilitate direct or indirect bi-directional communication between service provider devices 602, 604, 606 and opportunity provider devices 610, 612, 614. Node 608 can be a standalone computing device, computing system, or network component, and can be accessible, for example, by a wired or wireless connection, or through an indirect connection such as through a computer network or communication network. Alternatively, node 608 can be an adjunct or component of any other network element within system 600 such as devices 602, 604, 606, 610, 612, 614.

Node 608 can include a processor and associated circuitry to execute or direct the execution of computer-readable instructions to obtain information. Node 608 can retrieve and execute software from storage, which can include a disk drive, a flash drive, memory circuitry, or some other memory device, and which can be local or remotely accessible. The software includes computer programs, firmware, or some other form of machine-readable instructions, and may include an operating system, utilities, drivers, network interfaces, applications, or some other type of software, including combinations thereof. Node 608 can receive instructions and other input at a user interface.

In operation, system 600 can allow a plurality of opportunity providers to communicate with a plurality of service providers. For example, a plurality of opportunity providers associated with devices 610, 612, 614 can invite one or more of the service provider's associated with service provider devices 602, 604, 606 to join the respective opportunity provider's network where each opportunity provider's network is independent and distinct from the others. The service provider authenticates each invitation separately and after authentication each service provider can receive any contract, term, and/or project opportunities from any of the authenticated opportunity providers. In addition, the availability or status information can be communicated to each opportunity provider authenticated by the service provider.

In an exemplary embodiment, two or more of the opportunity providers can link networks together creating an extended network. For example, a first opportunity provider associated with opportunity provider device 610 and a second opportunity provider associated with opportunity provider device 612 can mutually approve combining the two separate networks. The decision to combine the networks can be based on a relational characteristic such as working for the same company or organization. When the two networks are combined, the opportunity providers can share connections. For instance, the service providers that previously authenticated the relationship with the first opportunity provider but have no previous relationship with the second opportunity provider can receive opportunities from the second opportunity provider. Likewise, the second opportunity provider can receive the availability status of each service provider associated with the first opportunity provider. The opportunities and responses to the opportunities can be ranked based on the primary and extended networks. For example, a service provider that was linked with the first opportunity provider can receive a list of opportunities where the opportunities from the first opportunity provider are ranked higher than the opportunities from the second opportunity provider. In other words, the ranking is based on the original network and the extended network created when the first opportunity provider and the second opportunity provider linked networks where the original network is associated with the higher ranking.

When the first opportunity provider and the second opportunity provider decide to terminate the combined network, the service providers can return to the original association with the respective opportunity provider. Alternatively, the service providers can remain connected to both the first opportunity provider and the second opportunity provider.

In another exemplary embodiment, a rating system can be employed such that an opportunity provider can rate a service provider and a service provider can rate an opportunity provider. The rating system can be stored locally at the respective devices such that the specific ratings are not shared over the network. When networks are shared between two opportunity providers, the ratings do not transfer and are not shared between the combined networks. Alternatively, opportunity providers can share ratings but not personal notes associated with the ratings when the networks are combined. In an exemplary embodiment, opportunity providers can maintain ratings throughout a career such that the ratings are transferable if an opportunity provider changes companies or organizations.

In another exemplary embodiment, a portal interface can be configured to facilitate communications between an opportunity provider and a service provider. The portal interface can be available at both the opportunity provider device and the service provider device. The portal interface can include various features. The portal interface can include the ability to select the version of the profile available at any time. For instance, the portal interface can allow a service provider to identify the type of profile (e.g., basic, secondary, enhanced) to be included in a blind matching search (e.g., a search in which the opportunity provider and a service provider do not have a previous relationship). The portal interface can also be configured to select which networks to join, which networks to disconnect with, and what updated and detailed availability is provided over the network on an ongoing basis. Identification of information to share with opportunity providers and recruiters can be changed on a dynamic basis. Service providers and/or opportunity providers can identify groups within networks such that the information shared with the group within the network is different from the information shared throughout the entire network. Any inquiries, requests for authentication, opportunities, etc., received within the portal can be managed and responded to within the portal interface thereby preventing additional communication through email, phone, etc. A service provider can identify, set, and modify personal availability status updates and control when updates are communicated throughout the network. In addition, the service provider can create detailed availability and status updates to include capacity and/or full-time/part-time designations where the service provider can identify which networks and/or opportunity providers that can view the updates. Separate documents such as resumes, transcripts, work samples, certifications, licenses, etc. can be uploaded and stored within the interface where numerous files and responses can be managed within the portal interface. An opportunity provider can initiate contact with a service provider through the portal interface, where contact outside the portal can be arranged. For example, phone meetings, hangout meetings, video conferences, in person meetings, etc., can all be documented, scheduled, and/or tracked within the portal interface.

The more a service provider and/or opportunity provider interacts with the portal interface, the more a service provider and/or opportunity provider can access certain information. For instance, after a service provider and/or opportunity provider completes a profile to a predetermined threshold, such as 80% of the data input fields and a user interacts with the system on a weekly basis such as by updating availability, providing opportunities, etc., the user can access compiled data such as currently trending skills that are in highest demand based on opportunities provided by opportunity providers, current pay rates for specific skills, pay rate trends, location (local and/or world-wide) and concentration of jobs and opportunities associated with a specific skill set, density of people who qualify and/or are within acceptable gap rate thresholds, etc. Rating information can also be stored within the portal interface. For example, work history and interactions can be documented where the ratings can be aggregated and shared only with other service providers within an identified group.

Additional vendor services can be purchased and managed through the portal interface. For example, service providers can purchase and manage liability and health insurance, online accounting, invoicing and collection services contractual services (e.g., a company to hold the paper and act as agent of record or employer of record), etc. In addition, the portal interface can store business administration assets in a personal folder (e.g., liability insurance).

A detailed availability status can be defined and shared with identified opportunity providers. For example, the availability status can include information associated with what factors would influence a service provider to re-locate and/or accept another opportunity such as location, quality of work, training, skills and experiences implemented, team, environment, etc. In addition, the detailed availability status can include an indication of when the current engagement ends and/or when a new engagement is desired (e.g., looking for an opportunity by a certain date). Further, the detailed availability status can include a full-time and/or part time indication and any qualifications based on the full-time/part-time designation. For example, an indication that a service provider is open to part time work if within a certain geographic location, pay rate range, specific skill set, etc.

Within the portal interface, a user can identify which profile updates and/or availability updates are shared within primary networks or secondary networks. For instance, when opportunity providers link networks and a service provider is not within the primary network of a secondary opportunity provider, the service provider can identify which profile updates and/or availability updates are shared throughout the primary network and the secondary network. Direct opportunity providers can be given different access from opportunity provider agents. For example, opportunity provider agents can be introduced within the portal and given restricted access to service providers and/or direct opportunity providers. For example, when the opportunity provider agent is a recruiter, the recruiter is required to generate a profile that clearly indicates that the person is a recruiter and is not a direct opportunity provider. In an exemplary embodiment, the portal interface can restrict an opportunity provider agent from accessing enhanced profiles provided by the service providers where direct opportunity providers can be given full access to enhanced profiles. Opportunity provider agents can be prevented from joining the system until a direct opportunity provider invites the opportunity provider agent through the portal interface.

The portal interface can connect with other systems. For example, the portal interface can allow an opportunity provider to link with an enterprise system where such that an internal applicant tracking system can be linked within the portal interface. Alternatively, the portal interface can be linked with other social networking systems to provide validation, references, etc.

Figure 7:
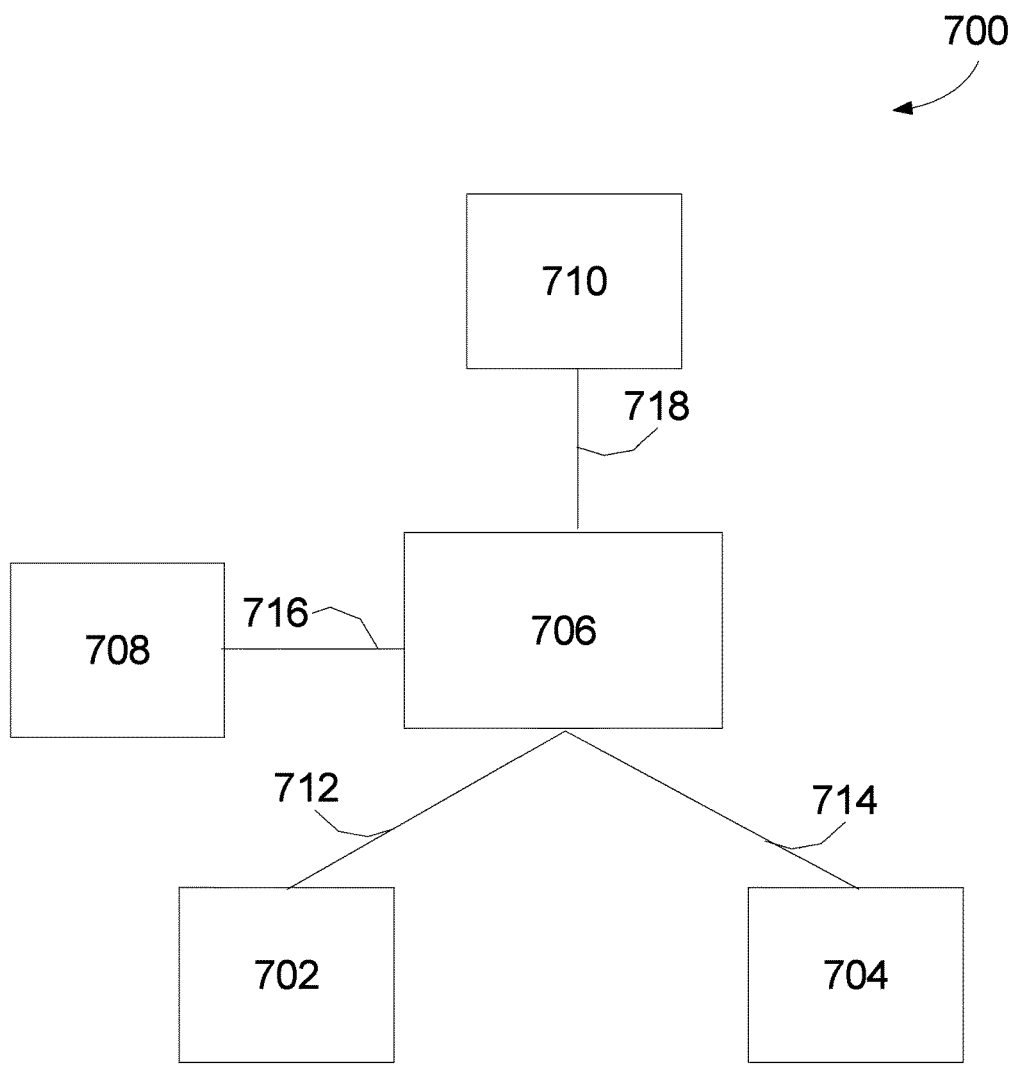
FIG. 7 illustrates an exemplary system for communicating between a service provider and an opportunity provider over a network.

FIG. 7 illustrates a system 700 for establishing communication between an opportunity provider and a service provider over a communication network. The system 700 can include a service provider device 702, an opportunity provider device 704, an enterprise network node 706, a storage node 708, and an enterprise network access device 710. While one service provider device 702, one opportunity provider device 704, and one enterprise network access device 710 are illustrated, system 700 can include any number of service provider devices 702, opportunity provider devices 704, and/or enterprise network access devices 710. In addition, other network elements may be present to facilitate communication within system 700 which are omitted for clarity, including processing nodes, routers, gateways, and physical and/or wireless data links for carrying data among the various network elements.

In an exemplary embodiment, the communication network of system 700 can be an enterprise network. However, system 700 can be any public or private communication network or combination thereof. An enterprise network is a communication network typically under the control of a single organization or company. The enterprise network integrates various networking devices and other resources throughout the organization or company to allow users within the network to securely communicate and/or store information within the boundaries of the organization or company. The enterprise network may include local and/or wide area networks (LAN, WAN) at one or more geographical locations. Various protocols can be implemented throughout the enterprise network.

Service provider device 702, opportunity provider device 704, and/or enterprise network access device 710 can be any device configured to communicate over system 700 using a communication interface. For example, the service provider device 702, opportunity provider device 704, and/or enterprise network access device 710 can be a wired or wireless device such as a computing platform including a personal computer, a laptop, a mobile device such as a smart phone or a tablet, a remote terminal unit, or any other network accessible device, and combinations thereof.

The interface of the service provider device 702, the opportunity provider device 704, and the enterprise network access device 710 can include one or more transceivers for transmitting and receiving data over communication system 700. In an exemplary embodiment, each device 702, 704, 710 can include a transceiver associated with at least one wireless protocol, at least one wired protocol, and/or other type of communication protocol.

Service provider device 702, the opportunity provider device 704, and the enterprise network access device 710 can communicate information over system 700 using various communication services. For example, information communicated over system 700 can be transmitted in various forms such as email, internet links, digital messaging, graphic messaging, video messaging, audio messaging, text messaging, SMS messaging, etc.

Service provider device 702, opportunity provider device 704, and enterprise network access device 710 can include a processor and associated circuitry to execute or direct the execution of computer-readable instructions to obtain information. Devices 702, 704, 710 can retrieve and execute software from storage, which can include a disk drive, a flash drive, memory circuitry, or some other memory device, and which can be local or remotely accessible. The software includes computer programs, firmware, or some other form of machine-readable instructions, and may include an operating system, utilities, drivers, network interfaces, applications, or some other type of software, including combinations thereof. Devices 702, 704, 710 can receive instructions and other input at a user interface. In an exemplary embodiment, the user interface of devices 702, 704, 710 can include various peripherals such as a display, a keyboard, a mouse, a printer, etc., where at least one peripheral can be used to input the instructions associated with communications over the system 700.

Service provider device 702 can be associated with a service provider such as any individual that provides services to an organization or company. The service provider can perform work on a temporary, contract, term, and/or project basis. In an exemplary embodiment, the service provider can include knowledge workers, independent consultants, free agents, freelancers, contractors, information technology worker, political staffers, medical workers, lawyers, accountants, professors, authors, hair stylists, bookkeepers, couriers, court reporters, engineers, entertainers, massage therapists, personal trainers, sale representatives, ride-sharing participants, tradesman, service industry workers, etc.

Opportunity provider device 704 can be associated with any individual or entity tasked with the responsibility of finding, hiring, engaging, and/or procuring the services of a service provider. The opportunity provider device 704 can be associated with a direct opportunity provider or an opportunity provider agent.

Enterprise network access device 710 can be associated with any individual within the organization or company that receives the benefit of the services provided by the service provider. For example, when a service provider is engaged to work on a project or assignment within a company, any (relevant) employee of the company may access information associated with the service provider over system 700 using the enterprise network access device 710. In addition, the enterprise network access device 710 can be configured to allow a user within the organization or company to access information associated with all service providers engaged within the system 700. In other words, while the opportunity provider device 704 is used only to access information associated with service providers that have confirmed an association with the opportunity provider, the enterprise network access device 710 allows a user within the organization or company to access information associated with all service providers currently engaged to provide services to the organization or company. In addition, the enterprise network device 710 allows a user within the organization or company to access information associated with all the opportunity providers connected within the system 700.

Enterprise network node 706 can be any network node configured to facilitate communication between service provider device 702, opportunity provider device 704, storage node 708, and/or enterprise network access device 710. Enterprise network node 706 can be a standalone computing device, computing system, or network component, and can be accessible, for example, by a wired or wireless connection, or through an indirect connection such as through a computer network or communication network. Alternatively, node 706 can be an adjunct or component of any other network element within system 700.

Enterprise network node 706 can include a processor and associated circuitry to execute or direct the execution of computer-readable instructions to obtain information. Enterprise network node 706 can retrieve and execute software from storage, which can include a disk drive, a flash drive, memory circuitry, or some other memory device, and which can be local or remotely accessible. The software includes computer programs, firmware, or some other form of machine-readable instructions, and may include an operating system, utilities, drivers, network interfaces, applications, or some other type of software, including combinations thereof. Enterprise network node 706 can receive instructions and other input at a user interface.

Storage node 708 is a network node configured to store information communicated over system 700 such as a server or other data base. Storage node 708 can include a processor and associated circuitry to execute or direct the execution of computer-readable instructions to store and retrieve information. Storage node 708 can retrieve and execute software from storage, which can include a disk drive, a flash drive, memory circuitry, or some other memory device. The software includes computer programs, firmware, or some other form of machine-readable instructions, and may include an operating system, utilities, drivers, network interfaces, applications, or some other type of software, including combinations thereof. Storage node 708 can be a standalone device or can be integrated into another network node such as enterprise network node 706.

In an exemplary embodiment, storage node 708 is configured to store information corresponding to various elements of system 700. For example, information associated with the service provider, information associated with the opportunity provider, information associated with the relationship between the service provider and the opportunity provider, etc. is stored at the storage node 708. Information stored at the storage node 708 can include service provider profile information, service provider status and/or availability information, opportunity provider profile information, and/or information associated with opportunities. In addition, the information stored at the storage node 708 can also include information associated with the relationship between each service provider and the opportunity provider. For instance, an opportunity provider can input information regarding the service provider such as a rating or ranking or other commentary regarding the service provider's performance, skill evaluations, feedback from managers, peers, clients, etc., reliability, etc. This information can be proprietary information associated with the organization or the company or this information can be personal information including impressions or observations generated by the opportunity provider regarding the service provider. When an opportunity provider disassociates from an organization or company (e.g., disconnects from system 700), the relationship between the service provider and the opportunity provider remains. However, the proprietary information associated with the organization or the company remains stored at the storage node 708 while the personal information including impressions or observations convey to the opportunity provider such that this information is removed from the storage node 708 and may be stored on a storage node of the next network in which the opportunity provider associates.

The service provider device 702 can transmit information to and/or receive information from the enterprise network node 706 over communication link 712. The opportunity provider device 704 can transmit information to and/or receive information from enterprise network node 706 over communication link 714. The enterprise network node 706 can transmit information to and/or receive information from the storage node 708 over communication link 716. The enterprise network access device 710 can transmit information to and/or receive information from the enterprise network node 706 over communication link 718. Communication links 712, 714, 716, 718 can use various communication media, such as air, space, metal, optical fiber, or some other signal propagation path—including combinations thereof.

In operation, system 700 can allow a user of the enterprise network access device 710 within an organization or company to oversee and aid in utilization of an extended workforce for the agency, organization, or company where the extended workforce includes one or more service providers. A service provider can establish a relationship with an opportunity provider where the opportunity provider is connected to system 700. The relationship between a service provider and an opportunity provider can be established before or after the opportunity provider becomes associated with the enterprise network. After the relationships are established, an interface displayed on the enterprise network access device 710 can provide a user with information associated with resources throughout the organization or company, capacity, utilization, etc. In addition, the interface can provide information associated with the status and availability of one or more service providers including identification and availability of specific skill sets, location availability, preferences for certain types of work (i.e., work at home, overnight shifts, ability to drive patients (home care workers), etc. The interface provides advanced capabilities to sort and track the resources, capacity, and utilization as well as create organization or company-wide reports where all of the information associated with service providers connected to the enterprise network can be accessed from the enterprise network access device 710. In addition, an interface can display to a user of the enterprise network access device 710 status and availability associated with each service provider where the availability can be displayed based on skill level, rate, location, or any other parameter. Moreover, the enterprise system can track reputations and past experiences of a service provider as well as past, current, and future resources and potential needs. In an exemplary embodiment, the interface is an API available throughout the enterprise network. The API can be further configured to collaborate with other enterprise tools such as for vendor management, human resource management, etc.

Figure 8:
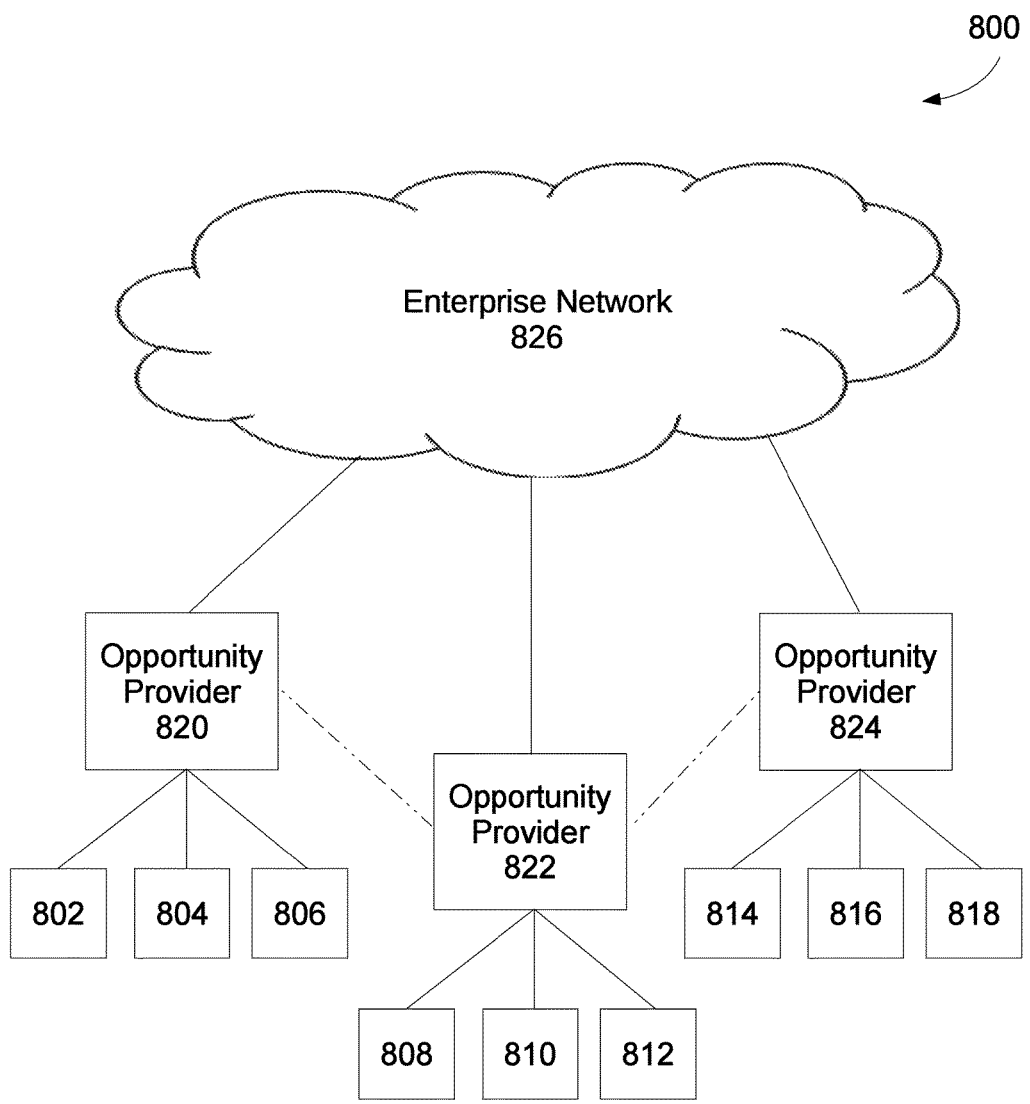
FIG. 8 illustrates an exemplary system for communicating between plurality of opportunity providers and a plurality of service providers over a network.

System 700 also allows service providers and opportunity providers to establish relationships within the enterprise system. For example, all of the opportunity providers connected to the enterprise network can share service providers in which they are connected to throughout the entire system 700. Specifically, as best illustrated in FIG. 8, opportunity providers 820, 822, 824 are connected to enterprise network 826. It is noted that for ease of explanation and illustration, the devices associated with each element of system 800 are omitted. However, one of ordinary skill in the art would recognize that an opportunity provider device, such as opportunity provider device 106, 310, 506, 508, 510, 610, 612, 614, or 710, is associated with each opportunity provider. Similarly, a service provider device and an enterprise network access device are also associated with each service provider and the enterprise network, respectively.

As illustrated in FIG. 8, opportunity provider 820 has established relationships with service providers 802, 804, 806, opportunity provider 822 has established relationships with service providers 808, 810, 812, and opportunity provider 824 has established relationships with service providers 814, 816, 818. These relationships are established using any method described herein. In an exemplary embodiment, service provider 814 has not established a relationship with opportunity provider 820 and thus would be excluded from the opportunities available via opportunity provider 820. However, after opportunity providers 820, 822, 824 establish communications with enterprise network 826 and thus establish a relationship with the network 826, opportunity providers 820, 822, 824 can establish direct communication links (e.g., the dashed lines) with each other or an indirect connection can be established through the enterprise network 826 to allow data and information to be shared between opportunity providers 820, 822, 824. For instance, service provider 814 can access opportunities associated with opportunity provider 820 and/or opportunity provider 822 and service provider 806 can access opportunities associated with opportunity provider 822 and/or opportunity provider 824.

Figure 9:
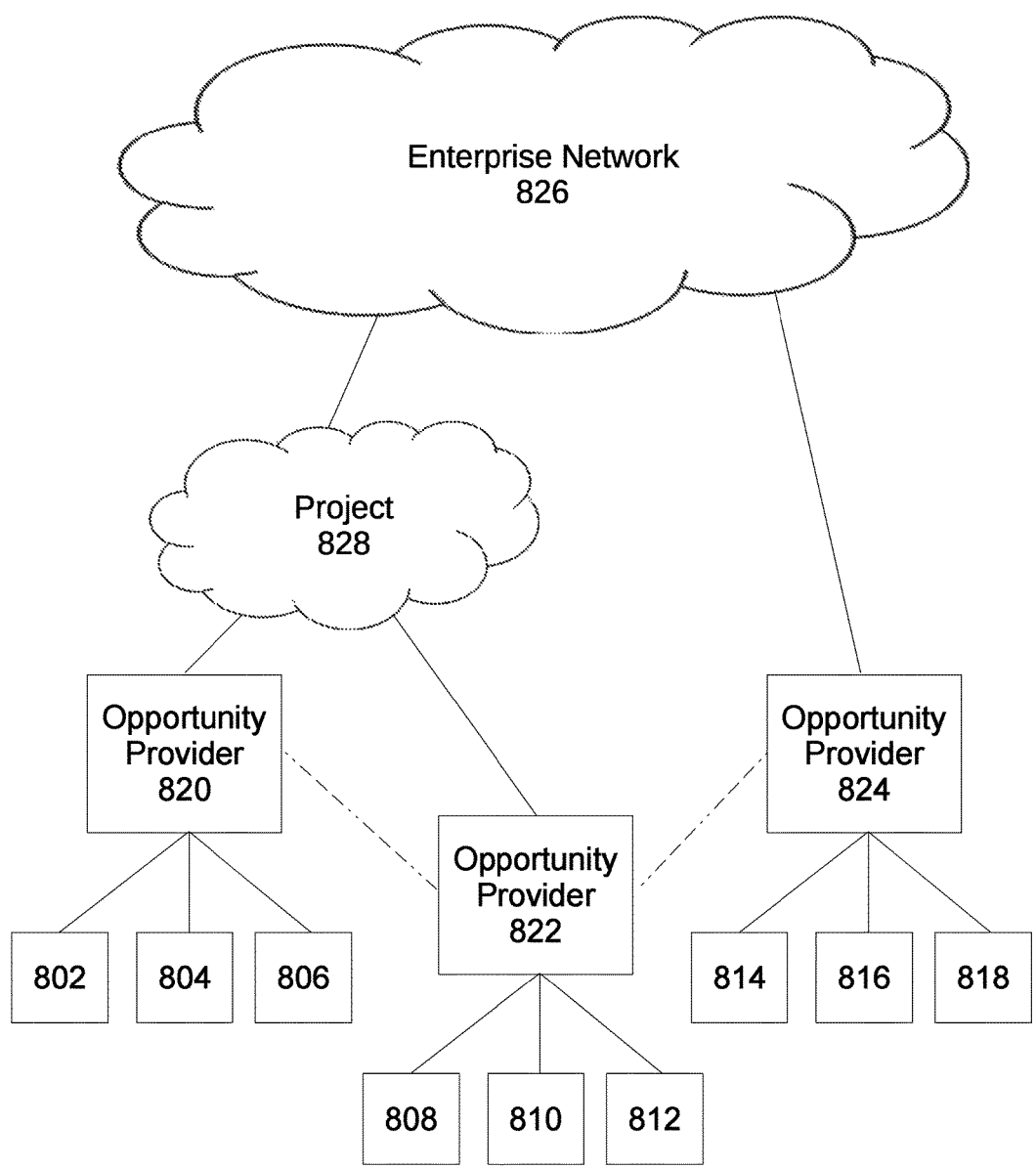
FIG. 9 illustrates another exemplary system for communicating between plurality of opportunity providers and a plurality of service providers over a network.

In another exemplary embodiment, as best illustrated in FIG. 9, a project group 828 may be added to the enterprise network 826 where opportunity providers 820, 822 are members of the project group 828. Project group 828 can be associated with a current and/or future project of the enterprise, organization, or company. An additional network device (not shown) may be used to access the network on behalf of the project. For example, a project manager with the organization or company can access system 700 using a separate network access device. Alternatively, the project group 808 may be a subgroup contained within the interface and the user of the enterprise network access device 710 can view status and availability information of the service providers that are members of the project group (e.g., service providers 802, 804, 806, 808, 810, 812). When an opportunity provider 820, 822, 824 disassociates from the enterprise network 826, the corresponding service providers 802, 804, 806, 808, 810, 812, 814, 816, 818 can be prompted to connect with the project 828 and/or the enterprise network 826 to remain directly connected after the opportunity provider 820, 822, 824 is no longer connected to the enterprise network 826.

It is noted that system 700 and/or enterprise network 826 may be associated with any type of organization or company. For example, system 700 and/or enterprise network 826 can be a company having one or more information technology projects where service providers are consultants that provide skills to achieve the goals of the project. System 700 and/or enterprise network 826 may also be a hospital including various departments where project 828 can be a department such as emergency room, pediatric unit, or cardiac department and the service providers are nurses, doctors, and/or other medical personnel. System 700 and/or enterprise network 826 can also be associated with a staffing agency such as a healthcare agency where project 828 can be an assignment to provide healthcare on an incremental basis (e.g., per day, per week, etc.)

Figure 10:
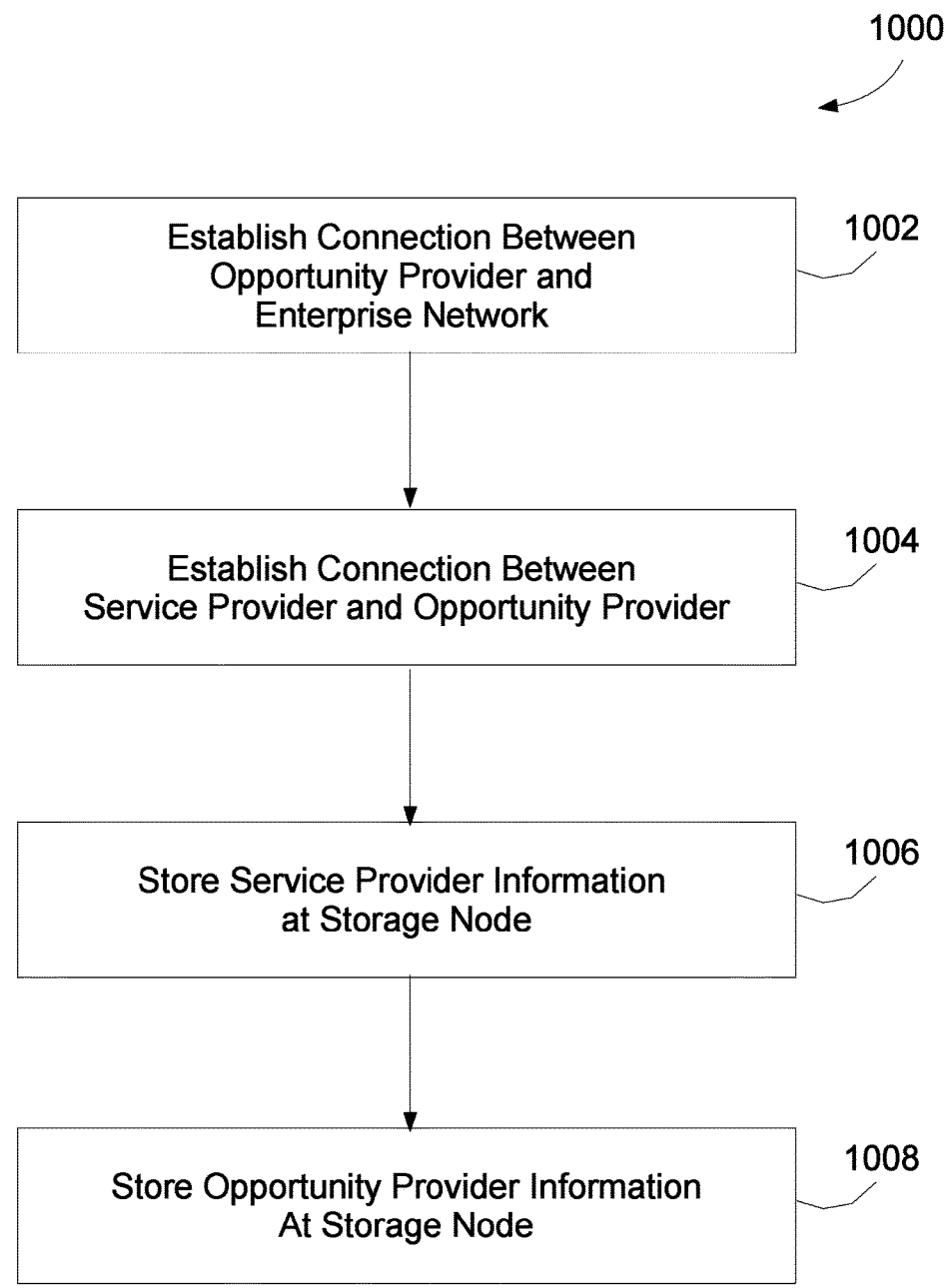
FIG. 10 illustrates an exemplary method of establishing communication between a service provider and an opportunity provider over a network.

FIG. 10 illustrates a flow chart of an exemplary method 1000 for establishing communications between an opportunity provider and an enterprise network. The method will be discussed with reference to the exemplary communication system 700 illustrated in FIG. 7. However, the method can be implemented with any suitable communication system. In addition, although FIG. 10 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 1002, a connection is established between an opportunity provider and an enterprise network. For example, an opportunity provider can initiate the communications by sending a request to connect to the network from the opportunity provider device 704 to the enterprise network node 706. The enterprise network node 706 can transmit the request to the enterprise network access device 710 where a user of the enterprise network access device 710 can approve the request to connect to the network 700 through an interface at the enterprise network access device 710. After the request to connect is approved, communication link 714 is established and the opportunity provider device 704 is authenticated over the network to provide secure transmissions within system 700. Alternatively, a user of the enterprise network access device 710 can initiate the communications by sending an invitation to the opportunity provider device 704 via the enterprise network node 706. After the opportunity provider accepts the invitation to join the enterprise network through an interface on the opportunity provider device 704, communication link 714 is established and the opportunity provider device 704 is authenticated over the network to provide secured transmissions within system 700.

At 1004, a connection is established between a service provider and the opportunity provider. Any of the methods described herein may be used to establish a connection between service provider device 702 and opportunity provider device 704. For example, the two-way authentication process may be implemented where the service provider and the opportunity provider authorize the connection based on a prior association. It is noted that while 1002 and 1004 are presented in a particular order, one of ordinary skill in the art would recognize that the connection established between the service provider and the opportunity provider at 1004 may occur before or after a connection is established between the opportunity provider and the enterprise network at 1002.

At 1006, service provider information is stored at a storage node. For example, the information and/or data associated with the service provider input at the service provider device 702 can be transmitted from the service provider device 702 to the storage node 708 via the enterprise network node 706. In an exemplary embodiment, the information and/or data associated with the service provider includes information relating to a profile of the service provider. The information and/or data can include at least one of the individual's name, sex, age, contact information such as address, email address, phone number, etc., user name, password, educational information, work experience, work history, skills, work-related skills, certifications, past employers, references, referrals, salary history, salary requirements, benefit requirements, location preferences, work environment preferences, technical competencies, conflict of interest, background checks, bill rate, availability, clearances, salary requirements, pay rate, hourly requirements (min/max), ability to travel, past working relationships, job requirements and specifications, compensation preferences, personal credit information and history, association memberships, work samples, transcripts, an identification of roles in prior projects (e.g., project manager, program manager, technical developer, etc.), an identification of a preference of role(s) for future project, and/or any other relevant or pertinent information.

In addition, information and/or data relating to the service provider's status and availability may also be transmitted from the service provider device 702 and stored at the storage node 708. Status information includes information regarding whether or not the service provider is able to currently perform services for the organization or company. Availability information includes information regarding current and/or future availability (e.g., the amount of capacity the service provider has to provide services to the organization or company). The availability information may be provided in various increments such as hourly, daily, weekly, and/or monthly including a designation of full-time availability or part-time availability.

While only one service provider device 702 is illustrated in FIG. 7, one of ordinary skill in the art would recognize that any number of service provider devices may be in communication with system 700 and thus information associated with each service provider's profile, status, and/or availability may be stored at storage node 708.

At 1008, opportunity provider information is stored at the storage node. For example, the information and/or data associated with the opportunity provider input at the opportunity provider device 704 is transmitted from the opportunity provider device 704 to the storage node 708 via the enterprise network node 706. In an exemplary embodiment, the information and/or data associated with the opportunity provider can include profile information and/or information associated with an opportunity. For example, information associated with an opportunity can include a description of services that are needed to be performed for a company, organization, or individual. The opportunity can further include a description of the context in which the services are to be performed. For example, the opportunity can include a description of the type of project in which the services will be performed, the type of work environment, skills implemented, training, etc. In an exemplary embodiment, the information associated with the opportunity can include at least one of: an opportunity provider name, a company name, opportunity offering, project requirement, project description, project role, technical skills/requirements, technical skill level (e.g., beginner, novice, expert, etc.), technical competencies or experience, years of experience, certification requirements, clearance requirements, citizenship requirements, state date, end date, length of assignment, job offering, position to be filled, company size, company location, regional location, number of employees, employee benefits offered, company history, salary or pay rate information, compensation information, customer information, supplier information, information from past employees, information from current employees, past or current employment agencies or recruiters, types of positions such as permanent or temporary positions, references, pictures of facilities, video clips, work hours, work requirements, recommendation letters, salary, alternative compensation information, etc.

While only one opportunity provider device 704 is illustrated in FIG. 7, one of ordinary skill in the art would recognize that any number of opportunity provider devices may be in communication with system 700 and thus information associated with each opportunity provider's profile and/or opportunity information may be stored at storage node 708.

After the connections between the service provider, the opportunity provider, and the enterprise network have been established and the service provider's information and the opportunity provider's information have been stored at the storage node 708, the enterprise network access device 710 can be used to monitor the status and availability of the extended workforce, provide oversight and/or management of current and future projects, and monitor outstanding opportunities available.

In addition, in an exemplary embodiment, the user of the enterprise network access device 710 can initiate direct communications with the service provider device 702 such as to collect information associated with the relationship between the enterprise network and the service provider. For example, an inquiry into which project a service provider has been engaged to work on, what primary skill was provided, the name of the point of contact associated with the project, the time-frame of the project, and/or the details regarding the work that was performed may be sent to a service provider. An inquiry whether the work was performed directly for the organization or company or through a subcontractor or a third party may be sent including the name of the subcontractor or third party and the point of contact for the subcontractor or third party. After the service provider responds to the inquiries, the information is stored at the storage node 708.

In an exemplary embodiment, the service provider can manage the network connection and interaction over the enterprise network in various ways. The service provider can identify parameters within an interface at the service provider device 702 where different parameters can be based on different levels of access available to the service provider. For example, a first-tier level of access can include the ability to accept unlimited invitations to connect with opportunity providers and enterprise networks where status and availability is shared with those connections, to invite opportunity providers and other service providers to connect and share status, availability, and profile updates throughout the service provider's network, to view and manage all opportunities received from connected opportunity providers and organizations or companies, refer qualified peer service providers to opportunity providers and organizations or companies within the service provider's network, keep track of all the connected opportunity providers and organizations or companies in the service provider's network including the ability to connect, disconnect, and reconnect with opportunity providers and organizations or companies based on selected opportunities or future projects, receiving periodic activity reports (e.g., weekly or bi-weekly) with a summary of activity, invitations, and acceptances, access an invite management system that allows to save and ignore unwanted invitation requests, and limit the inquiries received based on verified profiles. A second-tier level of access can include access to a verification score and indicator on the service provider's profile, access to an opportunity providers verification score on any invitations from the opportunity provider, ability to review IT staffing firms, agencies, recruiters, hiring managers, opportunity providers, and consulting firms, access to a project directory where the service provider can contribute and view a project director created by and for peers including project names and details not publically available, access to different software platforms in order to access the interface, and the ability to share ratings of projects, firms, opportunity providers, companies and organizations, etc. with other peers. A third-tier level of access can include the ability to be ranked higher than other service providers such that the service provider shows up as a higher candidate in a resulting list created when opportunity providers or enterprise network users conduct a search, the ability to highlight the profile of the service provider to the enterprise network in which the service provider is connected, the ability to display unique service provider identifying information such as a signup or position number that peers and opportunity providers can view, the ability to designate preferred organizations, companies, opportunity providers, and projects, the ability to select to display profile to other members of the network such as opportunity providers, etc. in which the service provider is not directly connected. A fourth-tier level of access can include the ability to view pay rate and skill market data such as the ability to see applicable pay rate, data of peer service providers. In an exemplary embodiment, the pay rate and skill market data may be aggregated based on the service provider's profile and pay rate. In addition, the service provider may be able to see data once a predetermined number of service providers with similar skills and profiles have been stored at the storage node 708. The fourth-tier level of access can further include the ability to post the profile publically to members inside and outside the network to increase viable pool of opportunity providers, projects, and enterprises to work with, the ability to certify and validate profile information within the interface, access to paperwork management folders and tools, the ability to connect with other service providers to establish groups based on skills, experience, etc., the ability to view opportunity provider ratings and contribute to the ratings, the ability to receive suggested enterprises to connect with and potential projects based on profile information such as indicated skills and the ability to accept invite to connect outside of network, access to a matching technology engine that helps to find qualified opportunity providers and projects, access to incentives using various techniques such as gamification to participate in larger prize pools where each sign up level receives a greater prize potential than the last level, and the ability to identify an interest in working for a specific enterprise, opportunity provider, or project.

In another exemplary embodiment, the opportunity provider can manage the network connection and interaction over the enterprise network in various ways. The opportunity provider can identify parameters within an interface at the opportunity provider device 704 where different parameters can be based on different membership levels available to the opportunity provider. For example, a basic membership can include the ability to share profile and resume information with all service providers after establishing a connection, to track the status of all service providers in which the opportunity provider is connected with (no matter whether the service provider is within the same enterprise network or not), to individually manage connections with service providers where the opportunity provider can select to connect, disconnect, and/or reconnect with service providers, to manage, track, and save undesired invitations to connect with other service providers, to accept invitations from other enterprise network systems, to display and communicate reputation information including a trust score based on feedback provided from service providers or enterprise network users, and the ability to verify and validate profile information at the opportunity provider device 704. A second-tier membership can include the ability to received inquiries only from verified profiles (e.g., verified service providers or users associated with the enterprise network node), to receive an activity report associated with activity, invitations, and acceptances, to identify which invitations to ignore if the sender is not qualified, to participate in advanced rating system and measurement tools, to gain access to various software platforms and applications including assisting in development of the same, to access to customized messaging including for a more efficient invitation process, to access information associated with when profile and resume information of all connections were last performed, and to display a unique network identifier with profile information. A third-tier membership can include the ability to search profiles outside of connections already established by the opportunity provider, to invite other service providers or opportunity providers to establish connections with the opportunity provider, to receive notifications when a connected service provider updates a profile information, to highlight opportunity provider's profile to the service providers within the opportunity provider's network, view, send, and receive service provider recommendations to and/or from other opportunity providers, access to an advanced dashboard within the interface for advanced sorting and tracking features, access to job sending and management module which allows the opportunity provider to post jobs publically to all service providers in the network and/or publically, access to advanced service provider searches and matching capabilities, access to incentives such as gamification methods to participate in larger prize pools (e.g., each sign up level receives greater prize potential than the last level), connection features with other opportunity providers, and to request an update from a specialty group from which a resource is needed.

In another exemplary embodiment, a user of the enterprise network access device 710 can oversee and manage the connections within the network. For example, through an interface at the enterprise network access device 710 a user can view opportunity providers networks and all of the activity within those networks, contact service providers associated with opportunity providers when the opportunity provider is connected to the network, retain and store contacts with service providers after the opportunity provider disconnects from the network during the time the opportunity provider was connected with the network, invite opportunity providers to join the network including opportunity providers within the network and out of the organization or company, grant access to opportunity providers to an enterprise toolset having various features including selective connection throughout the network, profile management for projects and enterprise profile, advanced in-tool messaging features, access to enterprise ratings and notes provided by the service providers and opportunity providers where the ratings and notes are stored at the storage node 708, access to an advanced dashboard to sort and track with detailed capacity and utilization reporting, integration and access to status and availability of all members of the network, and storage and access to opportunity postings internally to the network and publicly.

A service provider, an opportunity provider, and/or a user of the enterprise network access node 710 can access and manage initiation information within the interface displayed at each device. The interface can display all invitations and provide the user with a choice to accept, erase, save, and/or ignore each invitation. For example, the interface can include two pages where the service provider, opportunity provider, and/or user of the enterprise network access node 710 can view new invitations from potential connections on a first page and invitations that are selected to be erased, saved, or ignored (e.g., declined or not immediately approved) on a second page. When another invitation is received that has already previously been selected to be erased, saved, or ignored, the new invitation can be displayed on the first page and include an indication of how many times the invitation has been sent from the same user (e.g., time 2, time 3, etc.). If a user's invitations are selected to be erased, saved, or ignored a predetermined number of times, the invitation can be displayed on the second page of the invitation management interface. In addition, having an invitation be erased, saved, or ignored a predetermined number of times can affect the ranking of the user when searches are performed. For example, the user's credibility is reduced when invitations are passed or saved a predetermined number of times such that the rank of the user falls within search result listings. In an exemplary embodiment, a user can select to automatically decline invitations to connect from users that are not verified. Each invitation can include identifying information of the user that initiated the invitation to connect such as a "recruiter/third party" indicator when the user is a recruiter not associated with an organization or company. Invitations can be initiated through the interface where contact information can be cut and paste from emails or spreadsheets and an accompanying message can be included within the invitation. The message can be a predetermined template or customized. The interface monitors each invitation sent and/or received by a user.

After an invitation is accepted and a connection is established, the connection between each user can be modified. For example, either party can temporarily discontinue a relationship or termination the connection to prevent direct communications between the parties. In addition, peer users (e.g., two or more service providers or two or more opportunity providers) can connect and form a group. In an exemplary embodiment, before an opportunity provider can send any invitations, the opportunity provider must be verified within the interface system (e.g., verified using cell phone or providing a credit card). Service providers can send invitations without first being verified.

A service provider can manage status and availability sharing within the interface. For example, the service provider can identify the frequency of status and availability communications sent to opportunity providers as well as identify specific opportunity providers to include or exclude in the status and availability updates. A service provider can indicate information regarding desired opportunities such as contact me if XYZ, I'll only move for this rate or to this area, etc. In an exemplary embodiment, the service provider can indicate groups in which to publish this information as well as control who can see them based on detailed group settings. Some of the parameters that the service provider can indicate include length of contract, remote vs. on-site, weekly hours, part time details, ability to share specific notes on how to contact, logistics, rate information, contract/vendor access, etc.

A service provider can indicate status and availability information using various techniques. In an exemplary embodiment, the service provider can indicate hourly, daily, weekly, and/or monthly availability using a calendar, pull down menu, or other technique that allows for granular availability indications. The service provider can also indicate part-time availability, full-time availability, and/or immediate availability. A service provider can be prompted to update status and availability information. In an exemplary embodiment, the service provider can be prompted at a predetermined frequency such as every 30 days or after the service provider has been inactive for a predetermined amount of time (e.g., send a prompt if the service provider has not updated status and availability information in over 30 days). In addition, the service provider can be prompted to update project information and current point of contact information at a predetermined interval such as every three months. If the service provider information is not updated, it may affect an accuracy score and may reduce the ranking of the service provider when search results are provided. Incentives may be used such as gamification techniques where basic incentives and notifications are included in the interface. The incentives can be used to elevate ranking within search string results.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to limit the invention to the precise embodiments disclosed. The specification describes specific examples to accomplish a more general goal that may be accomplished in another way. Those skilled in the art will appreciate that the features described above can be combined in various ways to form multiple variations of the invention.

What is claimed is:

1. A method for communicating information within an interface system, the method comprising:
   receiving, from a first computing device by a processor of an interface system computing device via a transceiver of the interface system computing device, information associated with a first opportunity provider, wherein the information associated with the first opportunity provider is input at the first computing device;

storing, by the processor of the interface system computing device, the information associated with the first opportunity provider in a memory in communication with the interface system computing device;

receiving, from a second computing device by the processor of the interface system computing device via the transceiver of the interface system computing device, information associated with an enterprise, wherein the information associated with the enterprise is input at the second computing device;

storing, by the processor of the interface system computing device, the information associated with the enterprise in the memory in communication with the interface system computing device;

receiving, by the processor of the interface system computing device via the transceiver of the interface system computing device, authorization to establish a connection between the first opportunity provider and the enterprise within the interface system;

generating, by the processor of the interface system computing device, first connection relationship indicator in response to receiving the authorization to establish the connection between the first opportunity provider and the enterprise within the interface system, wherein the first connection relationship indicator represents that the connection between the first opportunity provider and the enterprise is established within the interface system;

storing, by the processor of the interface system computing device, the generated first connection relationship indicator in the memory in communication with the interface system computing device;

receiving, from a third computing device by the processor of the interface system computing device via the transceiver of the interface system computing device, information associated with a first service provider, wherein the information associated with the first service provider is input at the third computing device;

storing, by the processor of the interface system computing device, the information associated with the first service provider in the memory in communication with the interface system computing device;

receiving, via the transceiver of the interface system computing device, authorization to establish a connection between the first service provider and the first opportunity provider within the interface system;

generating, by the processor of the interface system computing device, a second connection relationship indicator in response to receiving the authorization to establish the connection between the first service provider and the first opportunity provider within the interface system, wherein the second connection relationship indicator represents that the connection between the first service provider and the first opportunity provider is established within the interface system;

storing, by the processor of the interface system computing device, the generated second connection relationship indicator in the memory in communication with the interface system computing device;

receiving, from the second computing device via the transceiver of the interface system computing device, a request to access a portion of the information associated with the first service provider;

determining, by the processor of the interface system computing device, whether a connection between the first service provider and the enterprise is established within the interface system based on one or more connection relationship indicators stored in the memory in communication with the interface system computing device in response to receiving the request to access the portion of the information associated with the first service provider;

determining, by the processor of the interface system computing device, that a connection between the first service provider and the enterprise is established within the interface system in response to identifying the first connection relationship indicator and the second connection relationship indicator from the memory in communication with the interface system computing device;

retrieving, by the processor of the interface system computing device, the portion of the information associated with the first service provider from the memory of the interface system computing device in response to determining that the connection between the first service provider and the enterprise is established within the interface system;

generating, by the processor of the interface system computing device, a message including the requested portion of the information associated with the first service provider retrieved from the memory of the interface system computing device;

transmitting, to the second computing device by the processor of the interface system computing device via the transceiver of the interface system computing device, the generated message including the requested portion of the information associated with the first service provider;

determining, by the processor of the interface system computing device, that a connection between the first service provider and the enterprise is not established within the interface system if the first connection relationship indicator or the second connection relationship indicator is not stored in the memory in communication with the interface system computing device;

generating, by the processor of the interface system computing device, a message denying the request to access the portion of the information associated with the first service provider in response to determining that the connection between the first service provider and the enterprise is not established within the interface system; and transmitting, to the second computing device by the processor of the interface system computing device via the transceiver of the interface system computing device, the generated message denying the request to access the portion of the information associated with the first service provider.

2. The method of claim 1, further comprising: receiving, from the second computing device, a request for information associated with a second service provider;

determining whether a connection is established between the first opportunity provider and the second service provider within the interface system based on the request for information associated with the second service provider;

transmitting, to the second computing device, the information associated with the second service provider when it is determined that a connection is established between the first opportunity provider and the second service provider within the interface system; and denying the request for information associated with the second service provider when it is determined that a connection between the first opportunity provider and the second service provider is not established within the interface system.

3. The method of claim 1, further comprising:
wherein the connection between the first service provider and the enterprise is established within the interface system when the first service provider is currently engaged to provide services to the enterprise.

4. The method of claim 1, further comprising:
receiving, at the interface system computing device, a request to terminate the connection between the first opportunity provider and the enterprise;

terminating the connection between the first opportunity provider and the enterprise within the interface system; and transmitting, to the third computing device, a request to establish a connection with the enterprise within the interface system after the request to terminate the connection between the first opportunity provider and the enterprise is received, wherein, after the connection between the first opportunity provider and the enterprise is terminated, the first service provider and the enterprise communicate within the interface system when a connection is established between the first service provider and the enterprise.

5. The method of claim 4, further comprising:
storing, at a storage node, the information associated with the first opportunity provider received from the first computing device; and removing at least a portion of the information associated with the first opportunity provider from the storage node when the connection between the first opportunity provider and the enterprise is terminated within the interface system.

6. The method of claim 1, further comprising:
receiving, at the interface system computing device, information associated with a second opportunity provider, the information associated with the second opportunity provider being received from a fourth computing device; and establishing a connection between the second opportunity provider and the enterprise within the interface system, wherein the connection between the first opportunity provider and the enterprise and the connection between the second opportunity provider and the enterprise forms a network, and wherein the first service provider and the enterprise communicate within the interface system based on the connection established between the first service provider and the first opportunity provider, the connection established between the first opportunity provider and the enterprise, and the connection established between the second opportunity provider and the enterprise.

7. The method of claim 6, wherein information associated with the first opportunity provider, information associated with the second opportunity provider, information associated with the enterprise, information associated with any service provider connected with the first opportunity provider, and information associated with any service provider connected with the second opportunity provider is available over the network within the interface system.

8. The method of claim 6, further comprising:
receiving, from the third computing device, a request for opportunities within the network;

determining opportunities available to the first service provider; and transmitting, to the third computing device, information associated with the opportunities available to the first service provider, wherein the opportunities available to the first service provider are determined based on the connection established between the first service provider and the first opportunity provider and the connection established between the second opportunity provider and the enterprise.

9. The method of claim 1, further comprising:
receiving, from the second computing device, instructions to establish a project group associated with the enterprise within the interface system;

transmitting, to the third computing device, a request for information associated with the project group; and establishing a connection between the first service provider and the project group within the interface system, wherein the first service provider and the enterprise communicate within the interface system based on the connection established between the first service provider and the first opportunity provider, the connection established between the first opportunity provider and the enterprise, and the connection established between the first service provider and the project group.

10. The method of claim 1,
wherein the information associated with the first service provider includes at least one accessibility parameter, and wherein the first service provider and the enterprise communicate within the interface system based on the connection established between the first service provider and the first opportunity provider, the connection established between the first opportunity provider and the enterprise, and the at least one accessibility parameter.

11. An interface system computing device configured to facilitate communication within an interface system, the interface system computing device comprising:
a transceiver configured to transmit and receive signals from a communication network;

a memory; and a processor coupled to the transceiver and the memory, and configured with processor-executable instructions to perform operations comprising:
receiving, from a first computing device via the transceiver, information associated with a first opportunity provider, wherein the information associated with the first opportunity provider is input at the first computing device;

storing the information associated with the first opportunity provider in the memory;

receiving from a second computing device via the transceiver, information associated with an enterprise, wherein the information associated with the enterprise is input at the second computing device;

storing the information associated with the enterprise computing device in the memory;

receiving, via the transceiver, authorization to establish a connection between the first opportunity provider and the enterprise within the interface system;

generating a first connection relationship indicator in response to receiving the authorization to establish the connection between the first opportunity provider and the enterprise within the interface system, wherein the first connection relationship indicator represents that the connection between the first opportunity provider and the enterprise is established within the interface system;
storing first connection relationship indicator in the memory;
receiving, from a third computing device via the transceiver, information associated with a first service provider, wherein the information associated with the first service provider is input at the third computing device;
storing the information associated with the first service provider in the memory;
receiving, via the transceiver, authorization to establish a connection between the first service provider and the first opportunity provider within the interface system;
generating a second connection relationship indicator in response to receiving the authorization to establish the connection between the first service provider and the first opportunity provider within the interface system, wherein the second connection relationship indicator represents that the connection between the first service provider and the first opportunity provider is established within the interface system;
storing the generated second connection relationship indicator in the memory;
receiving, from the second computing device via the transceiver, a request to access a portion of the information associated with the first service provider;
determining whether a connection between the first service provider and the enterprise is established within the interface system based on one or more connection relationship indicators stored in the memory in response to receiving the request to access the portion of the information associated with the first service provide;
determining that a connection between the first service provider and the enterprise is established within the interface system in response to identifying the first connection relationship indicator and the second connection relationship indicator from the memory;
retrieving the portion of the information associated with the first service provider from the memory in response to determining that the connection between the first service provider and the enterprise is established within the interface system;
generating a message including the requested portion of the information associated with the first service provider retrieved from the memory;
transmitting, to the second computing device via the transceiver, the generated message including the requested portion of the information associated with the first service provider;
determining that a connection between the first service provider and the enterprise is not established within the interface system if the first connection relationship indicator or the second connection relationship indicator is not stored in memory;
generating a message denying the request to access the portion of the information associated with the first service provider in response to determining that the connection between the first service provider and the enterprise is not established within the interface system; and
transmitting, to the second computing device via the transceiver, the generated message denying the request to access the portion of the provide information.

12. The interface system computing device of claim 11, wherein the processor is configured to execute the processor-executable instructions to perform further operations comprising:
receiving a request for information associated with a second service provider from the second computing device;
determining whether a connection is established between the first opportunity provider and the second service provider within the interface system based on the request for information;
transmitting the information associated with the second service provider to the second computing device when it is determined that a connection is established between the first opportunity provider and the second service provider within the interface system; and
transmitting a message denying the request for information associated with the second service provider to the second computing device when it is determined that a connection between the first opportunity provider and the second service provider is not established within the interface system.

13. The interface system computing device of claim 11, wherein the connection between the first service provider and the enterprise is established within the interface system when the first service provider is currently engaged to provide services to the enterprise.

14. The interface system computing device of claim 11, wherein the processor is configured to execute the processor-executable instructions to perform further operations comprising:
receiving a request to terminate the connection between the first opportunity provider and the enterprise;
terminating the connection between the first opportunity provider and the enterprise within the interface system; and
transmitting a request to establish a connection with the enterprise within the interface system to the third computing device after the request to terminate the connection between the first opportunity provider and the enterprise is received,
wherein, after the connection between the first opportunity provider and the enterprise is terminated, the first service provider and the enterprise communicate within the interface system when a connection is established between the first service provider and the enterprise.

15. The interface system computing device of claim 14, wherein the processor is configured to execute the processor-executable instructions to perform further operations comprising:
storing the information associated with the first opportunity provider received from the first computing device, and
removing at least a portion of the information associated with the first opportunity provider stored at the storage node when the connection between the first opportunity provider and the enterprise is terminated within the interface system.

16. The interface system computing device of claim 11, wherein the processor is configured to execute the processor-executable instructions to perform further operations comprising:
receiving information associated with a second opportunity provider, the information associated with the second opportunity provider being received at the transceiver in a signal from a fourth computing device; and establishing a connection between the second opportunity provider and the enterprise within the interface system, wherein the connection between the first opportunity provider and the enterprise and the connection between the second opportunity provider and the enterprise forms a network, and wherein the first service provider and the enterprise communicate within the interface system based on the connection established between the first service provider and the first opportunity provider, the connection established between the first opportunity provider and the enterprise, and the connection established between the second opportunity provider and the enterprise.

17. The interface system computing device of claim 16, wherein information associated with the first opportunity provider, information associated with the second opportunity provider, information associated with the enterprise, information associated with any service provider connected with the first opportunity provider, and information associated with any service provider connected with the second opportunity provider is available over the network within the interface system via the interface system computing device.

18. The interface system computing device of claim 16, wherein the processor is configured to execute the processor-executable instructions to perform further operations comprising:

receiving a request within the interface system for opportunities within the network from the first service provider;

determining opportunities available to the first service provider; and transmitting to the third computing device information associated with the opportunities available to the first service provider, wherein the opportunities available to the first service provider are determined based on the connection established between the first service provider and the first opportunity provider and the connection established between the second opportunity provider and the enterprise.

19. The interface system computing device of claim 11, wherein the processor is configured to execute the processor-executable instructions to perform further operations comprising:

receiving instructions to establish a project group associated with the enterprise within the interface system;

transmitting a request for information associated with the project group to the third computing device: and establishing a connection between the first service provider and the project group within the interface system, wherein the first service provider and the enterprise communicate within the interface system via the interface system computing device based on the connection established between the first service provider and the first opportunity provider, the connection established between the first opportunity provider and the enterprise, and the connection established between the first service provider and the project group.

20. The interface system computing device of claim 11, wherein the information associated with the first service provider includes at least one accessibility parameter, and wherein the first service provider and the enterprise communicate within the interface system via the interface system computing device based on the connection established between the first service provider and the first opportunity provider, the connection established between the first opportunity provider and the enterprise, and the at least one accessibility parameter.

\* \* \* \* \*